United States Patent
Rai

(10) Patent No.: US 9,117,225 B2
(45) Date of Patent: Aug. 25, 2015

(54) APPARATUSES, METHODS AND SYSTEMS FOR TRANSFORMING USER INFRASTRUCTURE REQUESTS INPUTS TO INFRASTRUCTURE DESIGN PRODUCT AND INFRASTRUCTURE ALLOCATION OUTPUTS

(71) Applicant: VISA INTERNATIONAL SERVICE ASSOCIATION, San Francisco, CA (US)

(72) Inventor: Sunil Rai, Sunnyvale, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 18 days.

(21) Appl. No.: 13/621,497

(22) Filed: Sep. 17, 2012

(65) Prior Publication Data
US 2013/0080640 A1    Mar. 28, 2013

Related U.S. Application Data

(60) Provisional application No. 61/660,153, filed on Jun. 15, 2012, provisional application No. 61/535,882, filed on Sep. 16, 2011.

(51) Int. Cl.
*G06F 15/173*    (2006.01)
*G06Q 30/02*    (2012.01)

(52) U.S. Cl.
CPC .................... *G06Q 30/0224* (2013.01)

(58) Field of Classification Search
CPC ................................................ G06Q 30/0224
USPC ................................................ 709/223, 226
See application file for complete search history.

(56) References Cited

U.S. PATENT DOCUMENTS

| 789,106 | A | 5/1905 | Seymour |
| 5,237,164 | A | 8/1993 | Takada |
| 5,311,594 | A | 5/1994 | Penzias |
| 5,446,890 | A | 8/1995 | Renslo et al. |
| 5,459,656 | A | 10/1995 | Fields et al. |
| 5,510,777 | A | 4/1996 | Pilc et al. |
| 5,521,362 | A | 5/1996 | Powers |
| 5,530,438 | A | 6/1996 | Bickham et al. |
| 5,536,045 | A | 7/1996 | Adams |

(Continued)

FOREIGN PATENT DOCUMENTS

| EP | 0855659 | 11/2007 |
| JP | 08-545210 | 12/2008 |

(Continued)

OTHER PUBLICATIONS

David Breitkopf, "ACS to Take Over Mich. WC Distribution Program", American Banker, New York, NY: Jul. 20, 2006, vol. 171. Issue 138, p. 6.

(Continued)

*Primary Examiner* — Mohamed Wasel
(74) *Attorney, Agent, or Firm* — Jones Day

(57) ABSTRACT

Systems and methods are disclosed for transforming user infrastructure requests and user purchase requests inputs into infrastructure design product and infrastructure allocation outputs. For example, a user infrastructure request is received and is correlated with pre-defined templates. A structured data file is parsed and sent to an infrastructure provider.

25 Claims, 20 Drawing Sheets

(56) References Cited

U.S. PATENT DOCUMENTS

| | | |
|---|---|---|
| 5,615,110 A | 3/1997 | Wong |
| 5,615,264 A | 3/1997 | Kazmierczak et al. |
| 5,649,118 A | 7/1997 | Carlisle et al. |
| 5,815,657 A | 9/1998 | Williams et al. |
| 5,850,446 A | 12/1998 | Berger et al. |
| 5,878,337 A | 3/1999 | Joao et al. |
| 5,903,830 A | 5/1999 | Joao et al. |
| 5,943,624 A | 8/1999 | Fox et al. |
| 5,963,924 A | 10/1999 | Williams et al. |
| 6,064,990 A | 5/2000 | Goldsmith |
| 6,092,053 A | 7/2000 | Boesch et al. |
| 6,202,052 B1 | 3/2001 | Miller |
| 6,202,933 B1 | 3/2001 | Poore et al. |
| 6,263,447 B1 | 7/2001 | French et al. |
| 6,267,292 B1 | 7/2001 | Walker et al. |
| 6,336,099 B1 | 1/2002 | Barnett et al. |
| 6,473,500 B1 | 10/2002 | Risafi et al. |
| 6,529,725 B1 | 3/2003 | Joao et al. |
| 6,535,855 B1 | 3/2003 | Cahill et al. |
| 6,601,761 B1 | 8/2003 | Katis |
| 6,735,572 B2 | 5/2004 | Landesmann |
| 6,853,982 B2 | 2/2005 | Smith et al. |
| 6,857,073 B2 | 2/2005 | French et al. |
| 6,873,974 B1 | 3/2005 | Schutzer |
| 6,898,598 B2 | 5/2005 | Himmel et al. |
| 6,934,528 B2 | 8/2005 | Loureiro et al. |
| 6,999,943 B1 | 2/2006 | Johnson et al. |
| 7,024,383 B1 | 4/2006 | Mancini et al. |
| 7,028,052 B2 | 4/2006 | Chapman et al. |
| 7,047,041 B2 | 5/2006 | Vanska et al. |
| 7,050,807 B1 | 5/2006 | Osborn |
| 7,051,002 B2 | 5/2006 | Keresman, III et al. |
| 7,089,208 B1 | 8/2006 | Levchin et al. |
| 7,096,003 B2 | 8/2006 | Joao et al. |
| 7,111,789 B2 | 9/2006 | Rajasekaran et al. |
| 7,155,411 B1 | 12/2006 | Blinn et al. |
| 7,177,848 B2 | 2/2007 | Hogan et al. |
| 7,194,437 B1 | 3/2007 | Britto et al. |
| 7,206,847 B1 | 4/2007 | Alberth et al. |
| 7,212,979 B1 | 5/2007 | Matz et al |
| RE39,736 E | 7/2007 | Morrill, Jr. |
| 7,268,667 B2 | 9/2007 | Beenau et al. |
| 7,268,668 B2 | 9/2007 | Beenau et al. |
| 7,290,704 B1 | 11/2007 | Ball et al. |
| 7,318,049 B2 | 1/2008 | Iannacci |
| 7,337,119 B1 | 2/2008 | Geschwender et al. |
| 7,337,144 B1 | 2/2008 | Blinn et al. |
| 7,343,149 B2 | 3/2008 | Benco et al. |
| 7,343,351 B1 | 3/2008 | Bishop et al. |
| 7,349,885 B2 | 3/2008 | Gangi |
| 7,356,505 B2 | 4/2008 | March |
| 7,357,310 B2 | 4/2008 | Calabrese et al. |
| 7,359,880 B2 | 4/2008 | Abel et al. |
| 7,373,669 B2 | 5/2008 | Eisen |
| 7,379,899 B1 | 5/2008 | Junger |
| 7,392,222 B1 | 6/2008 | Hamilton et al. |
| 7,395,242 B2 | 7/2008 | Blinn et al. |
| 7,398,250 B2 | 7/2008 | Blinn et al. |
| 7,413,113 B1 | 8/2008 | Zhu |
| 7,450,966 B2 | 11/2008 | Vanska et al. |
| 7,477,780 B2 | 1/2009 | Boncyk et al. |
| 7,499,889 B2 | 3/2009 | Golan et al. |
| 7,500,607 B2 | 3/2009 | Williams |
| 7,533,064 B1 | 5/2009 | Boesch |
| 7,536,360 B2 | 5/2009 | Stolfo et al. |
| 7,571,139 B1 | 8/2009 | Giordano et al. |
| 7,571,140 B2 | 8/2009 | Weichert et al. |
| 7,593,858 B2 | 9/2009 | Matz et al. |
| 7,603,311 B1 | 10/2009 | Yadav-ranjan |
| 7,630,937 B1 | 12/2009 | Mo et al. |
| 7,634,295 B2 | 12/2009 | Hayaashi et al. |
| 7,644,037 B1 | 1/2010 | Ostrovsky |
| 7,644,859 B1 | 1/2010 | Zhu |
| 7,660,749 B2 | 2/2010 | Koski |
| 7,676,434 B2 | 3/2010 | Evans |
| 7,685,067 B1 | 3/2010 | Britto et al. |
| 7,685,206 B1 | 3/2010 | Mathew et al. |
| 7,698,221 B2 | 4/2010 | Blinn et al. |
| 7,707,113 B1 | 4/2010 | Dimartino et al. |
| 7,708,194 B2 | 5/2010 | Vawter |
| 7,708,198 B2 | 5/2010 | Gangi |
| 7,712,658 B2 | 5/2010 | Gangi |
| 7,739,194 B2 | 6/2010 | Blinn et al. |
| 7,742,984 B2 | 6/2010 | Mohsenzadeh |
| 7,756,888 B2 | 7/2010 | Johnson et al. |
| 7,774,076 B2 | 8/2010 | Skowronek |
| 7,783,569 B2 | 8/2010 | Abel et al. |
| 7,784,684 B2 | 8/2010 | Labrou et al. |
| 7,801,829 B2 | 9/2010 | Gray et al. |
| 7,802,719 B2 | 9/2010 | Johnson et al. |
| 7,810,720 B2 | 10/2010 | Lovett |
| 7,819,307 B2 | 10/2010 | Lyons et al. |
| 7,828,206 B2 | 11/2010 | Hessburg et al. |
| 7,828,992 B2 | 11/2010 | Kilickiran et al. |
| 7,837,125 B2 | 11/2010 | Biskupski |
| 7,844,530 B2 | 11/2010 | Ziade et al. |
| 7,849,014 B2 | 12/2010 | Erikson |
| 7,870,027 B1 | 1/2011 | Tannenbaum |
| 7,877,299 B2 | 1/2011 | Bui |
| 7,878,400 B2 | 2/2011 | Harris |
| 7,890,370 B2 | 2/2011 | Whitsitt et al. |
| 7,895,119 B2 | 2/2011 | Praisner |
| 7,899,744 B2 | 3/2011 | Bishop et al. |
| 7,904,360 B2 | 3/2011 | Evans |
| 7,908,227 B2 | 3/2011 | Zizzimopoulos et al. |
| 7,926,714 B1 | 4/2011 | Zhu |
| 7,933,779 B2 | 4/2011 | Rooks et al. |
| 7,942,337 B2 | 5/2011 | Jain |
| 7,962,418 B1 | 6/2011 | Wei et al. |
| 7,967,196 B1 | 6/2011 | Bierbaum et al. |
| 7,971,782 B1 | 7/2011 | Shams |
| 7,996,259 B1 | 8/2011 | Distefano, III |
| 8,016,192 B2 | 9/2011 | Messerges et al. |
| 8,020,763 B1 | 9/2011 | Kowalchyk et al. |
| 8,024,260 B1 | 9/2011 | Hogl et al. |
| 8,028,041 B2 | 9/2011 | Olliphant et al. |
| 8,032,438 B1 | 10/2011 | Barton et al. |
| 8,041,338 B2 | 10/2011 | Chen et al. |
| 8,050,997 B1 | 11/2011 | Nosek et al. |
| 8,060,413 B2 | 11/2011 | Castell et al. |
| 8,074,876 B2 | 12/2011 | Foss et al. |
| 8,108,261 B2 | 1/2012 | Carlier et al. |
| 8,127,982 B1 | 3/2012 | Casey et al. |
| 8,140,418 B1 | 3/2012 | Casey et al. |
| 8,145,188 B2 | 3/2012 | Park et al. |
| 8,145,561 B1 | 3/2012 | Zhu |
| 8,145,566 B1 | 3/2012 | Ahuja et al. |
| 8,145,569 B2 | 3/2012 | Gong |
| 8,145,898 B2 | 3/2012 | Kamalakantha |
| 8,150,767 B2 | 4/2012 | Wankmueller |
| 8,150,772 B2 | 4/2012 | Mardikar et al. |
| 8,151,328 B1 | 4/2012 | Lundy |
| 8,151,330 B2 | 4/2012 | Vishik et al. |
| 8,151,336 B2 | 4/2012 | Savoor |
| 8,155,999 B2 | 4/2012 | De Boer et al. |
| 8,156,000 B1 | 4/2012 | Thompson |
| 8,156,026 B2 | 4/2012 | Junger et al. |
| 8,156,042 B2 | 4/2012 | Winkelman, III et al. |
| 8,156,549 B2 | 4/2012 | Rice et al. |
| 8,157,178 B2 | 4/2012 | Dewan et al. |
| 8,157,181 B2 | 4/2012 | Bates et al. |
| 8,160,935 B2 | 4/2012 | Bui |
| 8,160,959 B2 | 4/2012 | Rackley, III et al. |
| 8,165,961 B1 | 4/2012 | Dimartino et al. |
| 8,166,068 B2 | 4/2012 | Stevens |
| RE43,351 E | 5/2012 | Jordan, Jr. |
| 8,170,921 B2 | 5/2012 | Stocker |
| 8,175,235 B2 | 5/2012 | Mumford et al. |
| 8,175,965 B2 | 5/2012 | Moore et al. |
| 8,175,967 B2 | 5/2012 | O'Leary et al. |
| 8,175,968 B2 | 5/2012 | O'Leary et al. |
| 8,175,975 B2 | 5/2012 | Cai et al. |
| 8,175,979 B2 | 5/2012 | Baentsch et al. |
| 8,176,416 B1 | 5/2012 | Williams et al. |

(56) References Cited

U.S. PATENT DOCUMENTS

| | | |
|---|---|---|
| 8,179,563 B2 | 5/2012 | King et al. |
| 8,180,289 B1 | 5/2012 | Glickman |
| 8,180,705 B2 | 5/2012 | Kowalchyk et al. |
| 8,190,513 B2 | 5/2012 | Felger |
| 8,191,775 B2 | 6/2012 | Hildred |
| 8,195,233 B2 | 6/2012 | Morikuni et al. |
| 8,195,544 B2 | 6/2012 | Horsfall |
| 8,195,547 B2 | 6/2012 | Aaltonen et al. |
| 8,195,565 B2 | 6/2012 | Bishop et al. |
| 8,195,576 B1 | 6/2012 | Grigg et al. |
| 8,196,131 B1 | 6/2012 | Von Behren et al. |
| 8,200,582 B1 | 6/2012 | Zhu |
| 8,204,774 B2 | 6/2012 | Chwast et al. |
| 8,204,829 B2 | 6/2012 | Alvarez et al. |
| 8,209,245 B2 | 6/2012 | Dennes |
| 8,209,744 B2 | 6/2012 | Zhu et al. |
| 8,214,288 B2 | 7/2012 | Olliphant et al. |
| 8,214,289 B2 | 7/2012 | Scipioni |
| 8,214,291 B2 | 7/2012 | Pelegero et al. |
| 8,214,292 B2 | 7/2012 | Duggal et al. |
| 8,214,293 B2 | 7/2012 | Powell |
| 8,214,886 B2 | 7/2012 | Foley et al. |
| 8,215,546 B2 | 7/2012 | Lin et al. |
| 8,219,411 B2 | 7/2012 | Matz et al. |
| 8,219,474 B2 | 7/2012 | Sutton et al. |
| 8,219,490 B2 | 7/2012 | Hammad et al. |
| 8,220,047 B1 | 7/2012 | Soghoian et al. |
| 8,224,702 B2 | 7/2012 | Mengerink et al. |
| 8,224,754 B2 | 7/2012 | Pastusiak et al. |
| 8,224,773 B2 | 7/2012 | Spiegel |
| 8,225,997 B1 | 7/2012 | Bierbaum et al. |
| 8,227,936 B1 | 7/2012 | Folk et al. |
| 8,229,354 B2 | 7/2012 | Sklovsky et al. |
| 8,229,808 B1 | 7/2012 | Heit |
| 8,229,844 B2 | 7/2012 | Felger |
| 8,229,851 B2 | 7/2012 | Doran et al. |
| 8,229,854 B2 | 7/2012 | Stephen et al. |
| 8,233,841 B2 | 7/2012 | Griffin et al. |
| 8,234,183 B2 | 7/2012 | Smith |
| 8,239,276 B2 | 8/2012 | Lin et al. |
| 8,244,580 B2 | 8/2012 | Mankoff et al. |
| 8,249,965 B2 | 8/2012 | Tumminaro |
| 8,255,278 B1 | 8/2012 | Young et al. |
| 8,255,323 B1 | 8/2012 | Casey et al. |
| 8,255,324 B2 | 8/2012 | Bercy et al. |
| 8,275,704 B2 | 9/2012 | Bishop et al. |
| 8,280,777 B2 | 10/2012 | Mengerink et al. |
| 8,281,998 B2 | 10/2012 | Tang et al. |
| 8,282,002 B2 | 10/2012 | Shams |
| 8,285,640 B2 | 10/2012 | Scipioni |
| 8,285,820 B2 | 10/2012 | Olliphant et al. |
| 8,285,832 B2 | 10/2012 | Schwab et al. |
| 8,286,875 B2 | 10/2012 | Tang et al. |
| 8,290,433 B2 | 10/2012 | Fisher et al. |
| 8,290,819 B2 | 10/2012 | Bawcutt |
| 8,290,829 B1 | 10/2012 | Katz et al. |
| 8,295,898 B2 | 10/2012 | Ashfield et al. |
| 8,296,187 B2 | 10/2012 | Light et al. |
| 8,296,204 B2 | 10/2012 | Templeton et al. |
| 8,296,228 B1 | 10/2012 | Kloor |
| 8,296,231 B2 | 10/2012 | Britto et al. |
| 8,301,500 B2 | 10/2012 | Pharris |
| 8,301,510 B2 | 10/2012 | Boesch |
| 8,301,556 B2 | 10/2012 | Hogl et al. |
| 8,311,520 B2 | 11/2012 | Choi et al. |
| 8,312,096 B2 | 11/2012 | Cohen et al. |
| 8,321,267 B2 | 11/2012 | Hoerenz et al. |
| 8,321,294 B2 | 11/2012 | Carlier et al. |
| 8,321,315 B2 | 11/2012 | Abel et al. |
| 8,321,338 B2 | 11/2012 | Baumgart et al. |
| 8,321,343 B2 | 11/2012 | Ramavarjula et al. |
| 8,326,756 B2 | 12/2012 | Egendorf |
| 8,326,769 B1 | 12/2012 | Weisman |
| 8,326,770 B1 | 12/2012 | Weisman |
| 8,327,450 B2 | 12/2012 | Clement et al. |
| 8,332,272 B2 | 12/2012 | Fisher |
| 8,332,275 B2 | 12/2012 | Poon et al. |
| 8,332,323 B2 | 12/2012 | Stals et al. |
| 8,335,720 B2 | 12/2012 | Juang et al. |
| 8,335,726 B1 | 12/2012 | Ling et al. |
| 8,335,822 B2 | 12/2012 | Ahmed et al. |
| 8,335,921 B2 | 12/2012 | Von Behren et al. |
| 8,335,932 B2 | 12/2012 | Von Behren et al. |
| 8,340,666 B2 | 12/2012 | Ramer et al. |
| 8,341,029 B1 | 12/2012 | Ramalingam et al. |
| 8,346,643 B2 | 1/2013 | Boyer et al. |
| 8,346,659 B1 | 1/2013 | Mohsenzadeh |
| 8,346,663 B2 | 1/2013 | Kawan |
| 8,352,323 B2 | 1/2013 | Fisher |
| 8,352,362 B2 | 1/2013 | Mohsenzadeh |
| 8,352,499 B2 | 1/2013 | Bharat et al. |
| 8,352,749 B2 | 1/2013 | Von Behren et al. |
| 8,355,987 B2 | 1/2013 | Hirson et al. |
| 8,359,070 B1 | 1/2013 | Zhu |
| 8,364,587 B2 | 1/2013 | Nuzum et al. |
| 8,364,590 B1 | 1/2013 | Casey et al. |
| 8,370,264 B1 | 2/2013 | Wei et al. |
| 8,380,177 B2 | 2/2013 | Laracey |
| 8,401,904 B1 | 3/2013 | Simakov et al. |
| 8,412,586 B1 | 4/2013 | Foulser et al. |
| 8,412,630 B2 | 4/2013 | Ross et al. |
| 8,417,633 B1 | 4/2013 | Chmara et al. |
| 8,423,462 B1 | 4/2013 | Amacker et al. |
| 2001/0037297 A1 | 11/2001 | McNair |
| 2001/0056359 A1 | 12/2001 | Abreu |
| 2002/0035451 A1 | 3/2002 | Rothermel |
| 2002/0040325 A1 | 4/2002 | Takae et al. |
| 2002/0077976 A1 | 6/2002 | Meyer et al. |
| 2002/0107755 A1 | 8/2002 | Steed et al. |
| 2002/0112014 A1 | 8/2002 | Bennett et al. |
| 2002/0116271 A1 | 8/2002 | Mankoff |
| 2002/0143614 A1 | 10/2002 | MacLean et al. |
| 2002/0186238 A1 | 12/2002 | Sylor et al. |
| 2003/0014307 A1 | 1/2003 | Heng |
| 2003/0026404 A1 | 2/2003 | Joyce et al. |
| 2003/0028481 A1 | 2/2003 | Flitcroft et al. |
| 2003/0080185 A1 | 5/2003 | Werther |
| 2003/0097318 A1 | 5/2003 | Yu et al. |
| 2003/0101134 A1 | 5/2003 | Liu et al. |
| 2003/0174823 A1 | 9/2003 | Justice et al. |
| 2003/0177361 A1 | 9/2003 | Wheeler et al. |
| 2003/0182310 A1 | 9/2003 | Charnock et al. |
| 2003/0191711 A1 | 10/2003 | Jamison et al. |
| 2003/0200142 A1 | 10/2003 | Hicks et al. |
| 2003/0200184 A1 | 10/2003 | Dominguez et al. |
| 2003/0212642 A1 | 11/2003 | Weller et al. |
| 2004/0039772 A1 | 2/2004 | De Miguel et al. |
| 2004/0078332 A1 | 4/2004 | Ferguson et al. |
| 2004/0103037 A1 | 5/2004 | Wetmore et al. |
| 2004/0128197 A1 | 7/2004 | Bam et al. |
| 2004/0138999 A1 | 7/2004 | Friedman et al. |
| 2004/0148255 A1 | 7/2004 | Beck et al. |
| 2004/0215963 A1 | 10/2004 | Kaplan |
| 2004/0230536 A1 | 11/2004 | Fung et al. |
| 2004/0236646 A1 | 11/2004 | Wu et al. |
| 2004/0254891 A1 | 12/2004 | Blinn et al. |
| 2004/0267608 A1 | 12/2004 | Mansfield, Jr. |
| 2005/0010483 A1 | 1/2005 | Ling |
| 2005/0021599 A1 | 1/2005 | Peters |
| 2005/0037735 A1 | 2/2005 | Coutts |
| 2005/0065819 A1 | 3/2005 | Schultz |
| 2005/0080747 A1 | 4/2005 | Anderson et al. |
| 2005/0080821 A1 | 4/2005 | Breil et al. |
| 2005/0097320 A1 | 5/2005 | Golan et al. |
| 2005/0137969 A1 | 6/2005 | Shah |
| 2005/0171894 A1 | 8/2005 | Traynor |
| 2005/0177600 A1 | 8/2005 | Eilam et al. |
| 2005/0192893 A1 | 9/2005 | Keeling et al. |
| 2005/0192895 A1 | 9/2005 | Rogers et al. |
| 2005/0220326 A1 | 10/2005 | Sim |
| 2005/0234817 A1 | 10/2005 | VanFleet et al. |
| 2005/0246278 A1 | 11/2005 | Gerber et al. |
| 2005/0254714 A1 | 11/2005 | Anne |
| 2005/0261967 A1 | 11/2005 | Barry et al. |

(56) References Cited

U.S. PATENT DOCUMENTS

| | | |
|---|---|---|
| 2006/0053043 A1 | 3/2006 | Clarke et al. |
| 2006/0053056 A1 | 3/2006 | Alspach-goss et al. |
| 2006/0053094 A1 | 3/2006 | Ravi et al. |
| 2006/0085328 A1 | 4/2006 | Cohen et al. |
| 2006/0085477 A1 | 4/2006 | Phillips et al. |
| 2006/0124729 A1 | 6/2006 | Martin |
| 2006/0129427 A1 | 6/2006 | Wennberg |
| 2006/0163349 A1 | 7/2006 | Neugebauer |
| 2006/0178986 A1 | 8/2006 | Giordano et al. |
| 2006/0190347 A1 | 8/2006 | Cuervo |
| 2006/0226216 A1 | 10/2006 | Keithley |
| 2006/0277143 A1 | 12/2006 | Almonte et al. |
| 2006/0293947 A1 | 12/2006 | Nicholson |
| 2007/0011025 A1 | 1/2007 | Cracchiolo et al. |
| 2007/0022132 A1* | 1/2007 | Brandt et al. ............... 707/102 |
| 2007/0038515 A1 | 2/2007 | Postrel |
| 2007/0038516 A1 | 2/2007 | Apple et al. |
| 2007/0050234 A1* | 3/2007 | Corlett ............... 705/10 |
| 2007/0055571 A1 | 3/2007 | Fox et al. |
| 2007/0087820 A1 | 4/2007 | Van Luchene et al. |
| 2007/0094066 A1 | 4/2007 | Kumar et al. |
| 2007/0100691 A1 | 5/2007 | Patterson |
| 2007/0100728 A1 | 5/2007 | Rotman et al. |
| 2007/0106607 A1 | 5/2007 | Seib et al. |
| 2007/0113289 A1 | 5/2007 | Blumenau |
| 2007/0143204 A1 | 6/2007 | Claus et al. |
| 2007/0150413 A1 | 6/2007 | Morgenstern |
| 2007/0180119 A1 | 8/2007 | Khivesara et al. |
| 2007/0208662 A1 | 9/2007 | Jeronimus et al. |
| 2007/0214078 A1 | 9/2007 | Coppinger |
| 2007/0214250 A1 | 9/2007 | Ahmed et al. |
| 2007/0226152 A1 | 9/2007 | Jones |
| 2007/0233590 A1 | 10/2007 | Hardison, III |
| 2007/0239502 A1 | 10/2007 | Babu |
| 2007/0276765 A1 | 11/2007 | Hazel et al. |
| 2008/0004116 A1 | 1/2008 | Van Luchene et al. |
| 2008/0004952 A1 | 1/2008 | Koli |
| 2008/0010096 A1 | 1/2008 | Patterson et al. |
| 2008/0021829 A1 | 1/2008 | Kranzley |
| 2008/0077489 A1 | 3/2008 | Gilley et al. |
| 2008/0086365 A1 | 4/2008 | Zollino et al. |
| 2008/0091553 A1 | 4/2008 | Koski |
| 2008/0091616 A1 | 4/2008 | Helwin et al. |
| 2008/0097856 A1 | 4/2008 | Blagg et al. |
| 2008/0114737 A1 | 5/2008 | Neely et al. |
| 2008/0126145 A1 | 5/2008 | Racklet, III et al. |
| 2008/0133351 A1 | 6/2008 | White et al. |
| 2008/0140568 A1 | 6/2008 | Henry |
| 2008/0147883 A1 | 6/2008 | Philyaw |
| 2008/0162361 A1 | 7/2008 | Sklovsky et al. |
| 2008/0167965 A1 | 7/2008 | Von Nothaus et al. |
| 2008/0172274 A1 | 7/2008 | Hurowitz et al. |
| 2008/0172331 A1 | 7/2008 | Graves et al. |
| 2008/0177574 A1 | 7/2008 | Lara Gonzalez et al. |
| 2008/0177672 A1 | 7/2008 | Brunner et al. |
| 2008/0223918 A1 | 9/2008 | Williams et al. |
| 2008/0270300 A1 | 10/2008 | Jones et al. |
| 2008/0272188 A1 | 11/2008 | Keithley et al. |
| 2008/0319905 A1 | 12/2008 | Carlson |
| 2009/0006181 A1 | 1/2009 | Ghosh et al. |
| 2009/0024527 A1 | 1/2009 | Sellen et al. |
| 2009/0037255 A1 | 2/2009 | Chiu et al. |
| 2009/0048934 A1 | 2/2009 | Haddad et al. |
| 2009/0061884 A1 | 3/2009 | Rajan et al. |
| 2009/0063261 A1 | 3/2009 | Scribner et al. |
| 2009/0064056 A1 | 3/2009 | Anderson et al. |
| 2009/0076953 A1 | 3/2009 | Saville et al. |
| 2009/0076966 A1 | 3/2009 | Bishop et al. |
| 2009/0089176 A1 | 4/2009 | Mccabe |
| 2009/0089193 A1 | 4/2009 | Paintin |
| 2009/0104888 A1 | 4/2009 | Cox |
| 2009/0106151 A1 | 4/2009 | Nelsen et al. |
| 2009/0119176 A1 | 5/2009 | Johnson |
| 2009/0119211 A1 | 5/2009 | Johnson |
| 2009/0132347 A1 | 5/2009 | Anderson et al. |
| 2009/0132395 A1 | 5/2009 | Lam et al. |
| 2009/0144104 A1 | 6/2009 | Johnson |
| 2009/0144695 A1* | 6/2009 | Vairavan et al. ............... 717/105 |
| 2009/0144703 A1* | 6/2009 | Vairavan et al. ............... 717/122 |
| 2009/0164344 A1 | 6/2009 | Shiftan et al. |
| 2009/0171778 A1 | 7/2009 | Powell |
| 2009/0182664 A1 | 7/2009 | Trombley |
| 2009/0210300 A1 | 8/2009 | Cansler et al. |
| 2009/0222347 A1 | 9/2009 | Whitten |
| 2009/0233579 A1 | 9/2009 | Castell et al. |
| 2009/0234751 A1 | 9/2009 | Chan et al. |
| 2009/0241159 A1 | 9/2009 | Campagna et al. |
| 2009/0254471 A1 | 10/2009 | Seidel et al. |
| 2009/0254479 A1 | 10/2009 | Pharris |
| 2009/0254535 A1 | 10/2009 | Eickelmann et al. |
| 2009/0265274 A1 | 10/2009 | Hahn-Carlson et al. |
| 2009/0271265 A1 | 10/2009 | Lay et al. |
| 2009/0288012 A1 | 11/2009 | Hertel et al. |
| 2009/0307135 A1 | 12/2009 | Gupta et al. |
| 2009/0313132 A1 | 12/2009 | McKenna et al. |
| 2009/0327045 A1 | 12/2009 | Olives et al. |
| 2009/0327088 A1 | 12/2009 | Puthupparambil et al. |
| 2010/0004989 A1 | 1/2010 | Bonalle et al. |
| 2010/0005025 A1 | 1/2010 | Kumar |
| 2010/0009663 A1 | 1/2010 | Chang |
| 2010/0010964 A1 | 1/2010 | Skowronek et al. |
| 2010/0023386 A1 | 1/2010 | Avisar et al. |
| 2010/0023455 A1 | 1/2010 | Dispensa et al. |
| 2010/0036741 A1 | 2/2010 | Cleven |
| 2010/0036775 A1 | 2/2010 | Edens |
| 2010/0042456 A1 | 2/2010 | Stinchcombe et al. |
| 2010/0042537 A1 | 2/2010 | Smith et al. |
| 2010/0042540 A1 | 2/2010 | Graves et al. |
| 2010/0049851 A1 | 2/2010 | Garrison et al. |
| 2010/0049879 A1 | 2/2010 | Leavitt et al. |
| 2010/0063903 A1 | 3/2010 | Whipple et al. |
| 2010/0076873 A1 | 3/2010 | Taylor et al. |
| 2010/0078471 A1 | 4/2010 | Lin et al. |
| 2010/0078472 A1 | 4/2010 | Lin et al. |
| 2010/0082444 A1 | 4/2010 | Lin et al. |
| 2010/0082445 A1 | 4/2010 | Hodge et al. |
| 2010/0082447 A1 | 4/2010 | Lin et al. |
| 2010/0082455 A1 | 4/2010 | Rosenblatt et al. |
| 2010/0082480 A1 | 4/2010 | Korosec |
| 2010/0082481 A1 | 4/2010 | Lin et al. |
| 2010/0082485 A1 | 4/2010 | Lin et al. |
| 2010/0082490 A1 | 4/2010 | Rosenblatt et al. |
| 2010/0082491 A1 | 4/2010 | Rosenblatt et al. |
| 2010/0088188 A1 | 4/2010 | Kumar et al. |
| 2010/0094730 A1 | 4/2010 | Koski |
| 2010/0100480 A1 | 4/2010 | Altman et al. |
| 2010/0121707 A1 | 5/2010 | Goeldi |
| 2010/0125492 A1 | 5/2010 | Lin et al. |
| 2010/0125495 A1 | 5/2010 | Smith et al. |
| 2010/0125803 A1 | 5/2010 | Johnson |
| 2010/0131347 A1 | 5/2010 | Sarptipi |
| 2010/0131415 A1 | 5/2010 | Sartipi |
| 2010/0155470 A1 | 6/2010 | Woronec |
| 2010/0161433 A1 | 6/2010 | White |
| 2010/0174599 A1 | 7/2010 | Rosenblatt et al. |
| 2010/0185505 A1 | 7/2010 | Sprogoe et al. |
| 2010/0185531 A1 | 7/2010 | Van Luchene |
| 2010/0191578 A1 | 7/2010 | Tran et al. |
| 2010/0191622 A1 | 7/2010 | Reiss et al. |
| 2010/0191770 A1 | 7/2010 | Cho et al. |
| 2010/0198626 A1 | 8/2010 | Cho et al. |
| 2010/0211445 A1 | 8/2010 | Bodington |
| 2010/0211452 A1 | 8/2010 | D'Angelo et al. |
| 2010/0211499 A1 | 8/2010 | Zanzot et al. |
| 2010/0217682 A1 | 8/2010 | Chan |
| 2010/0223385 A1 | 9/2010 | Gulley et al. |
| 2010/0250351 A1 | 9/2010 | Gillenson et al. |
| 2010/0276484 A1 | 11/2010 | Banerjee et al. |
| 2010/0281455 A1 | 11/2010 | Anand et al. |
| 2010/0305848 A1 | 12/2010 | Stallman |
| 2010/0306075 A1 | 12/2010 | Drance et al. |
| 2010/0306113 A1 | 12/2010 | Grey et al. |
| 2010/0312645 A1 | 12/2010 | Niekadlik et al. |
| 2010/0312676 A1 | 12/2010 | Muthukumaran |

(56) References Cited

U.S. PATENT DOCUMENTS

| | | |
|---|---|---|
| 2010/0332262 A1 | 12/2010 | Horvitz et al. |
| 2010/0332283 A1 | 12/2010 | Ng et al. |
| 2011/0047075 A1 | 2/2011 | Fourez |
| 2011/0078082 A1 | 3/2011 | Gupta |
| 2011/0082789 A1 | 4/2011 | Boyd |
| 2011/0099057 A1 | 4/2011 | Tenyer |
| 2011/0105183 A1 | 5/2011 | Hsiao et al. |
| 2011/0106698 A1 | 5/2011 | Issacson et al. |
| 2011/0137742 A1 | 6/2011 | Parikh |
| 2011/0161497 A1 | 6/2011 | Childress et al. |
| 2011/0178896 A1 | 7/2011 | Nakajima et al. |
| 2011/0184827 A1 | 7/2011 | Hubert |
| 2011/0215146 A1 | 9/2011 | Shams |
| 2011/0218870 A1 | 9/2011 | Shams et al. |
| 2011/0246290 A1 | 10/2011 | Howard et al. |
| 2011/0258123 A1 | 10/2011 | Dawkins et al. |
| 2011/0296508 A1 | 12/2011 | Os et al. |
| 2011/0320344 A1 | 12/2011 | Faith et al. |
| 2012/0011063 A1 | 1/2012 | Killian et al. |
| 2012/0022943 A1 | 1/2012 | Howard et al. |
| 2012/0023026 A1 | 1/2012 | Chen et al. |
| 2012/0030101 A1 | 2/2012 | Boyd |
| 2012/0036071 A1 | 2/2012 | Fulton et al. |
| 2012/0084167 A1* | 4/2012 | Corlett ........................ 705/26.3 |
| 2012/0084204 A1 | 4/2012 | Castell et al. |
| 2012/0095895 A1 | 4/2012 | Aston |
| 2012/0101881 A1 | 4/2012 | Taylor et al. |
| 2012/0116966 A1 | 5/2012 | Tan |
| 2012/0118950 A1 | 5/2012 | Belk |
| 2012/0123838 A1 | 5/2012 | Sparks |
| 2012/0136780 A1 | 5/2012 | El-Awady et al. |
| 2012/0166333 A1 | 6/2012 | von Behren et al. |
| 2012/0173431 A1 | 7/2012 | Ritchie et al. |
| 2012/0190386 A1 | 7/2012 | Anderson |
| 2012/0215640 A1 | 8/2012 | Ramer et al. |
| 2012/0215650 A1 | 8/2012 | Oba et al. |
| 2012/0221421 A1 | 8/2012 | Hammad |
| 2012/0221502 A1 | 8/2012 | Jerram et al. |
| 2012/0231844 A1 | 9/2012 | Coppinger |
| 2012/0259763 A1 | 10/2012 | Pessin |
| 2012/0304273 A1 | 11/2012 | Bailey et al. |
| 2012/0310826 A1 | 12/2012 | Chatterjee |
| 2012/0323664 A1 | 12/2012 | Klems |
| 2013/0090750 A1 | 4/2013 | Herrman et al. |

FOREIGN PATENT DOCUMENTS

| | | |
|---|---|---|
| KR | 10-0432430 | 5/2004 |
| KR | 06-0117177 | 11/2006 |
| KR | 07-0104087 | 10/2007 |
| WO | WO01/65502 | 9/2001 |
| WO | WO03023674 | 3/2003 |
| WO | WO2010/148737 | 12/2010 |

OTHER PUBLICATIONS

Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, p. 1.

Gopalan, NP & Selvan, B Siva. TCP/IP Illustrated. Prentice-Hall. 2008. pp. 101-102, 175-176 and 235.

Shadrach, D.C. "A Weighted Metric Based Adaptive Algorithm for Web Server Load Balancing." 2009 Third International Symposium on Intelligenr Information Technology Application, http://ieeexplore.ieee.org/xpl/articleDetails.jsp?amumber=5369384, pp. 449-452.

International Search Report and Written Opinion for PCT/US09/54921 mailed Oct. 21, 2009.

International Search Report and Written Opinion for PCT/US2010/048344 mailed Nov. 15, 2010.

International Search Report and Written Opinion for PCT/US2010/033861 mailed Dec. 9, 2010.

International Search Report and Written Opinion for PCT/US2010/033547 mailed Dec. 14, 2010.

International Preliminary Report on Patentability for PCT/US2010/033229 mailed Dec. 29, 2010.

International Search Report and Written Opinion for PCT/US2010/041860 mailed Feb. 1, 2011.

International Search Report and Written Opinion for PCT/US2010/045445 mailed Feb. 24, 2011.

International Search Report and Written Opinion for PCT/US2010/045500 mailed Mar. 29, 2011.

International Search Report and Written Opinion for PCT/US2011/024941 mailed Apr. 19, 2011.

International Search Report and Written Opinion for PCT/US2010/046833 mailed Apr. 26, 2011.

International Search Report and Written Opinion for PCT/US2011/26734 mailed Apr. 29, 2011.

International Search Report and Written Opinion for PCT/US2011/29790 mailed May 19, 2011.

International Search Report and Written Opinion for PCT/US2011/035268 mailed Aug. 5, 2011.

International Search Report and Written Opinion for PCT/US2011/032093 mailed Aug. 24, 2011.

International Search Report and Written Opinion for PCT/US11/39178 mailed Sep. 16, 2011.

International Search Report and Written Opinion for PCT/US2011/42062 mailed Sep. 29, 2011.

International Search Report for PCT/US11/49393 mailed Dec. 5, 2011.

International Search Report and Written Opinion for PCT/US11/57179 mailed Jan. 5, 2012.

International Search Report and Written Opinion for PCT/US11/57173 mailed Mar. 15, 2012.

International Search Report and Written Opinion for PCT/US11/57180 mailed Mar. 15, 2012.

International Search Report for PCT/US12/21000 mailed May 15, 2012.

International Search Report for PCT/US11/65305 mailed Apr. 16, 2012.

International Search Report for PCT/US12/26205, mailed May 29, 2012.

International Search Report for PCT/US12/23856 mailed Jun. 6, 2012.

International Search Report and Written Opinion for PCT/US2012/027043 mailed Jul. 13, 2012.

International Search Report for PCT/US12/24772 mailed Jul. 24, 2012.

International Search Report for PCT/US12/25530 mailed Aug. 7, 2012.

International Search Report PCT/US12/27620 mailed Aug. 10, 2012.

International Search Report and Written Opinion for PCT/US12/41437 mailed Aug. 24, 2012.

International Search Report and Written Opinion for PCT/US12/37597 mailed Sep. 21, 2012.

International Search Report for PCT/US12/39638 mailed Sep. 24, 2012.

International Search Report for PCT/US12/45875 mailed Nov. 16, 2012.

International Search Report for PCT/US12/47092 mailed Nov. 26, 2012.

International Search Report for PCT/US12/57577 mailed Nov. 29, 2012.

International Search Report and Written Opinion for PCT/US12/55636 mailed Nov. 30, 2012.

International Search Report for PCT/US12/57528 mailed Dec. 17, 2012.

International Search Report and Written Opinion for PCT/US2012/045601 mailed Feb. 1, 2013.

International Search Report for PCT/US12/66898 mailed Feb. 11, 2013.

(56) References Cited

OTHER PUBLICATIONS

International Search Report and Written Opinion for PCT/US2012/069557 mailed Feb. 22, 2013.
International Search Report for PCT/US12/56759 mailed Feb. 25, 2013.
International Search Report and Written Opinion for PCT/US12/65738 mailed Apr. 19, 2013.
International Search Report and Written Opinion for PCT/US2013/020411 mailed May 21, 2013.
International Search Report and Written Opinion for PCT/US2013/024538, mailed May 31, 2013.

* cited by examiner

APPARATUSES, METHODS AND SYSTEMS FOR TRANSFORMING USER INFRASTRUCTURE REQUESTS INPUTS TO INFRASTRUCTURE DESIGN PRODUCT AND INFRASTRUCTURE ALLOCATION OUTPUTS

PRIORITY CLAIM

Applicant hereby claims priority under 35 U.S.C. §119 to provisional U.S. patent application Ser. No. 61/535,882, filed Sep. 16, 2011, entitled "INFORMATION TECHNOLOGY INFRASTRUCTURE DESIGN APPARATUSES, METHODS AND SYSTEMS;" and provisional U.S. patent application Ser. No. 61/660,153, filed Jun. 15, 2012, entitled "INFORMATION TECHNOLOGY INFRASTRUCTURE DESIGN APPARATUSES, METHODS AND SYSTEMS." The entire contents of the aforementioned applications are herein expressly incorporated by reference.

This patent application disclosure document (hereinafter "description" and/or "descriptions") describes inventive aspects directed at various novel innovations (hereinafter "innovation," "innovations," and/or "innovation(s)") and contains material that is subject to copyright, mask work, and/or other intellectual property protection. The respective owners of such intellectual property have no objection to the facsimile reproduction of the parent disclosure document by anyone as it appears in published Patent Office file/records, but otherwise reserve all rights.

FIELD

The present innovations are directed generally to information technologies, and more particularly, to INFORMATION TECHNOLOGY INFRASTRUCTURE DESIGN APPARATUSES, METHODS AND SYSTEMS.

BACKGROUND

Information technology includes the management of computers, network, routers, and storage devices. Managing such resources may include allocating said computers, network routers, and storage devices to particular tasks.

BRIEF DESCRIPTION OF THE DRAWINGS

The accompanying appendices and/or drawings illustrate various non-limiting, example, innovative aspects in accordance with the present descriptions.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

INFORMATION TECHNOLOGY INFRASTRUCTURE DESIGN APPARATUSES, METHODS AND SYSTEMS (hereinafter "IT-ID") transforms user infrastructure requests and user purchase requests inputs via IT-ID components into infrastructure design product and infrastructure allocation outputs. The IT-ID also provides project driven end-to-end solutions, whereby the information technology infrastructure (e.g., a server, a software application, etc.) is offered based on users' requests and the design and provisioning of the infrastructure is automated.

In some implementations, the allocation and usage of the infrastructure may involve payment. Based on the type of infrastructure delivered and the time period it is in use, payment may be transferred from the user to the infrastructure provider.

IT-ID

Figure 1A:
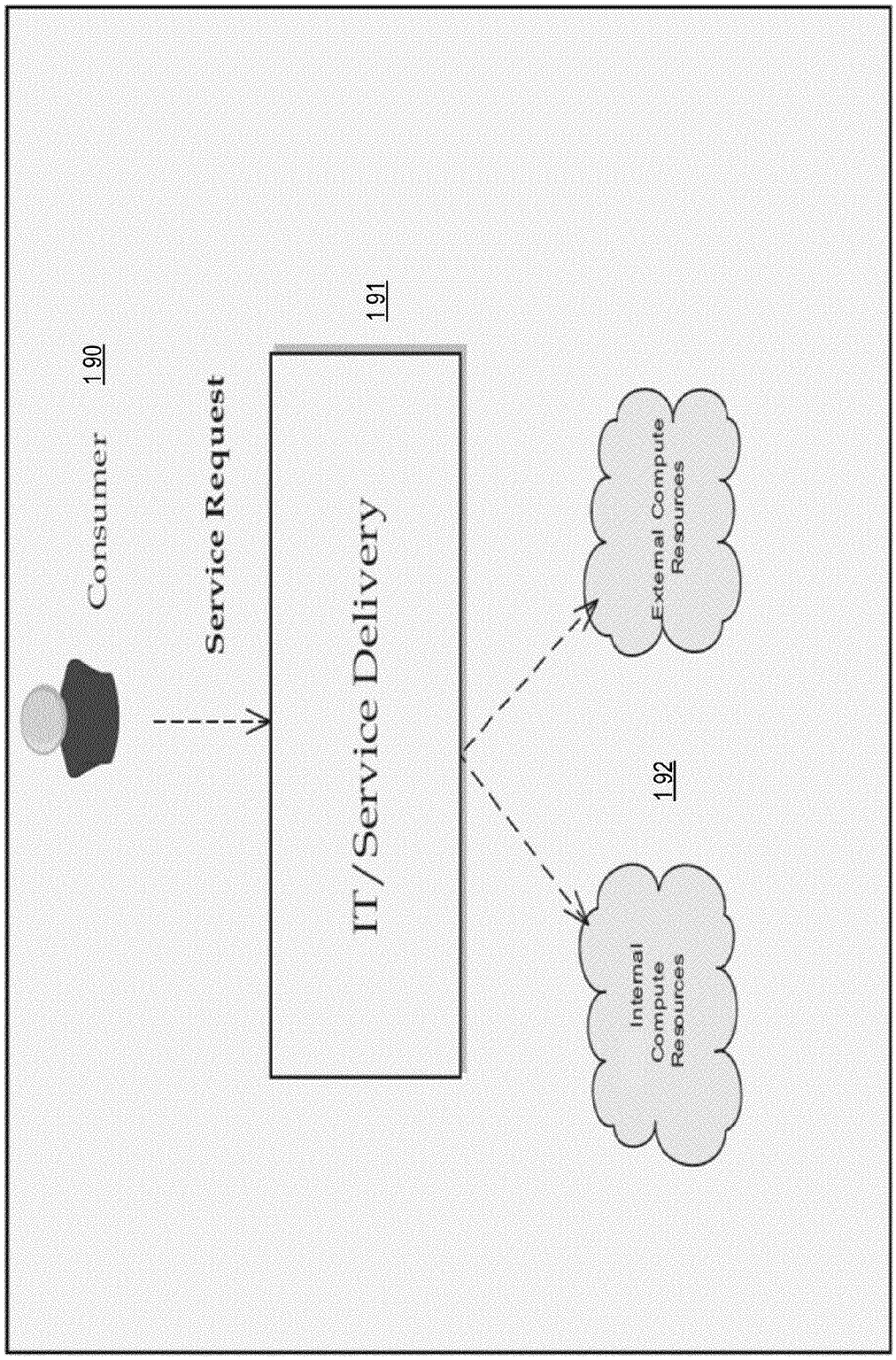
FIG. 1A shows a block diagram illustrating data flows within various embodiments of the IT-ID.

FIG. 1A shows a block diagram illustrating various embodiments of the IT-ID. In some implementations, a user 190 may utilize the IT-ID in order to process a service request for information technology infrastructure 191. This request may undergo a process that allocates internal resources (e.g., resources within the user's enterprise), or externally (e.g., in an external cloud system) 192, depending on the request made and the resources available.

Figure 1B:
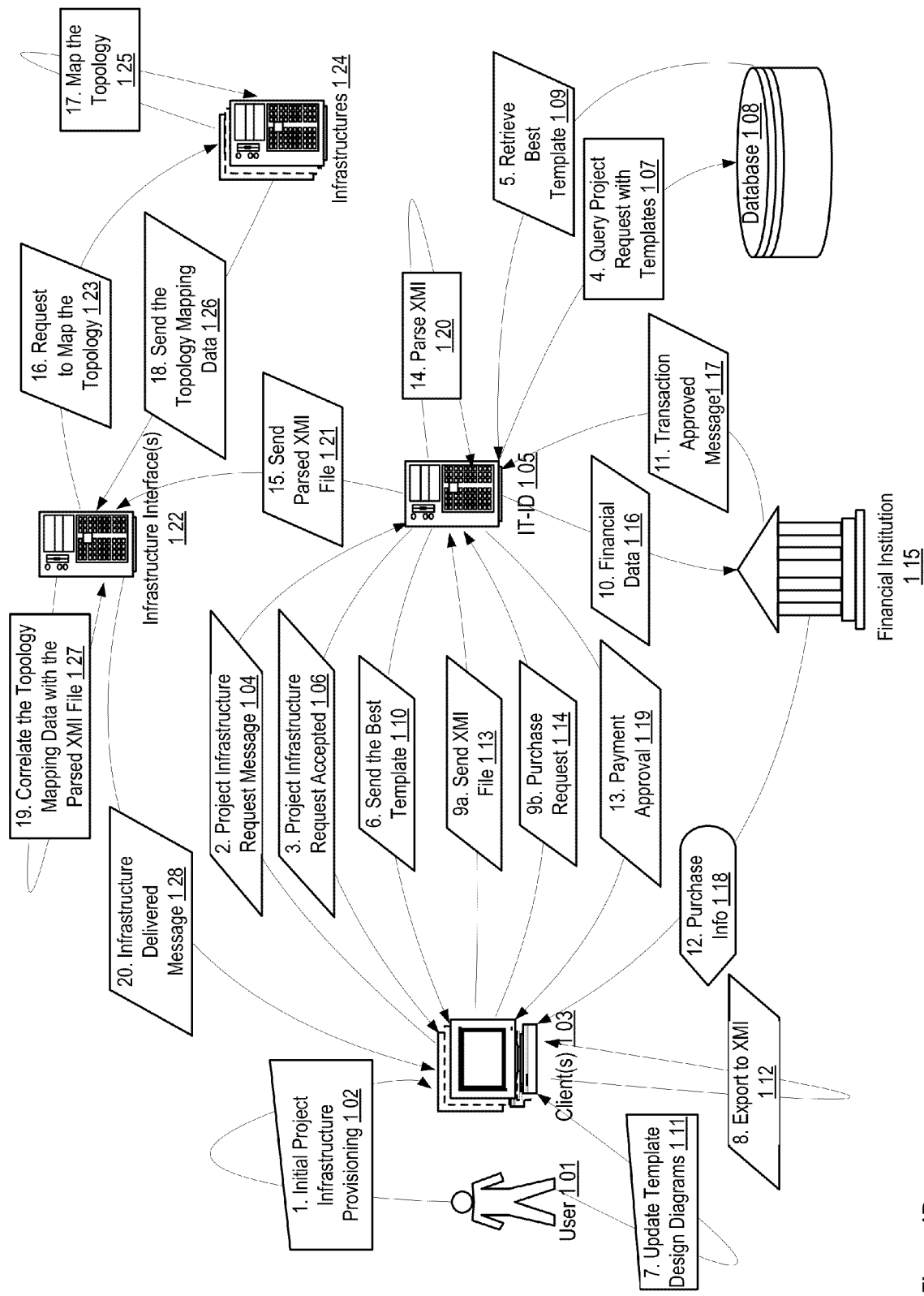
FIG. 1B shows a block diagram illustrating data flows within various embodiments of the IT-ID.

FIG. 1B shows a block diagram illustrating data flows within various embodiments of the IT-ID. In some implementations, one or more user(s) 101, client(s) 103, IT-ID server 105, IT-ID database 108, infrastructure interface(s) 122, infrastructures 124, and/or financial institution(s) 115 are shown to interact via various communication networks.

A user 101 may desire to use infrastructure on a project by providing initial project infrastructure provisioning request 102 to a client device 103. In some example aspect, the client device 103 may be a user's web-enable computer (e.g., laptop, desktop, tablet, etc.) or a mobile communication device (e.g., PDA, smartphone, etc.). The client device 103 submits a project infrastructure request message 104 to the IT-ID server 105 via a communication network. The IT-ID 105 processes the project infrastructure request message 104 and provides a response to the client device 103 if the request is accepted 106.

In some implementations, using the user's input, the client may generate a project infrastructure request, e.g., 104, and provide the project infrastructure request to the IT-ID server. For example, the client may provide a (Secure) Hypertext Transfer Protocol ("HTTP(S)") POST message including data formatted according to the eXtensible Markup Language ("XML"). Below is an example HTTP(S) POST message including an XML-formatted project infrastructure request for the IT-ID server:

```
POST /requestinfrastructure.php HTTP/1.1
Host: www.ITIDprocess.com
Content-Type: Application/XML
Content-Length: 624
<?XML version = "1.0" encoding = "UTF-8"?>
<project_infrastructure_request>
    <timestamp>2011-02-22 15:22:44</timestamp>
      <user_params>
        <user_ID>12345</user_ID>
        <user_name>John Smith</user_name>
        <client_name>CompanyABC</client_name>
      </user_params>
      <project_params>
        <project_ID>1CB8A93P</project_ID>
        <project_name>New Software Testing</project_name>
        <project_start_date>2011-03-01 9:00:00</project_start_date>
        <project_end_date>2011-03-03 20:59:59</project_end_date>
        <project_expected_avg_loads>10,000 transactions per
hour</project_expected_avg_loads>
        <project_expected_max_loads>20,000 transactions per
hour</project_expected_avg_loads>
        <project_expected_min_loads>1,000 transactions per
hour</project_expected_avg_loads>
      </project_params>
      <infrastructure_params>
        <hardware>IBM Blade</hardware>
        <operating_system>Red Hat Linux 5.5.64bit</operating_system>
        <application>Websphere Application</application>
      </infrastructure_params>
</project_infrastructure_request>
```

The IT-ID server 105 may query the user's project infrastructure request with pre-defined templates 107 stored in the database 108. The database 108 may further provide to the IT-ID server 105 a template 109 which is the best match to the user's request. The database may also store new templates. For example, the database may be a relational database responsive to Structured Query Language ("SQL") commands. The IT-ID server may execute a hypertext preprocessor ("PHP") script including SQL commands to query the database for the template data. An example PHP/SQL command listing, illustrating substantive aspects of querying the database, is provided below:

```
<?PHP
header('Content-Type: text/plain');
mysql_connect("254.93.179.112",$DBserver,$password); //
access database server
mysql_select_db("TEMPLATE.SQL"); // select database table to search
//create query
$query = "SELECT prjoject_ID project_name project_params
infrastructure_params
template FROM TemplateTable WHERE project_name
LIKE '%' software";
$result = mysql_query($query); // perform the search query
mysql_close("TEMPLATE.SQL"); // close database access
?>
```

In some implementations, the template 109 may comprise system components such as, but not limited to, network, hardware, operating system, storage, and/or a combination of these components. In another embodiment, a template may further comprise software components in addition to the foregoing system components. In one embodiment, a template may comprise a combination of system components and software components to provide a customized solution to a project. In another embodiment, the templates may be documented and version controlled.

In other implementations, the IT-ID server 105 may probe the network to determine what infrastructure resources are available and generate a new template based on the available infrastructure resources.

The IT-ID server 105 may then send the best template 110 to the client device 103. The user may review the template and update the template with new design diagrams 111 using hand-made modeling tools or automated modeling tools. The hand-made modeling tools may be constructed via Unified Modeling Language (hereafter "UML") or Systems Modeling Language (hereafter "SysML"). For example, SPARX Enterprise Architect (hereafter "SPARX EA") may be used to modify the template.

In some implementations, using the user's input, the client may generate a request to update the template design diagrams, e.g., 111, and provide the request to the IT-ID server. For example, the client may provide a (Secure) Hypertext Transfer Protocol ("HTTP(S)") POST message including data formatted according to the eXtensible Markup Language ("XML"). Below is an example HTTP(S) POST message including an XML-formatted request for the IT-ID server:

```
POST /requestinfrastructurechange.php HTTP/1.1
Host: www.ITIDprocess.com
Content-Type: Application/XML
Content-Length: 624
<?XML version = "1.0" encoding ="UTF-8"?>
<infrastructure_change_request>
    <timestamp>2011-02-22 15:22:44</timestamp>
      <user_params>
        <user_ID>12345</user_ID>
        <user_name>John Smith</user_name>
        <client_name>Company1</client_name>
      </user_params>
      <project_params>
        <project_ID>1CB8A93P</project_ID>
        <project_name>New Software Testing</project_name>
        <project_start_date>2011-03-01 9:00:00</project_start_date>
        <project_end_date>2011-03-03 20:59:59</project_end_date>
      </project_params>
      <old_infrastructure_params>
        <hardware>3 servers</hardware>
        <operating_system>Red Hat Linux
5.5.64bit</operating_system>
        <application>Websphere Application</application>
      </old_infrastructure_params>
      <new_infrastructure_params>
        <hardware>5 servers</hardware>
        <operating_system>Red Hat Linux
5.5.64bit</operating_system>
        <application>Websphere Application</application>
      </new_infrastructure_params>
</infrastructure_change_request>
```

In other implementations, the user may update the template design diagrams using SPARX EA. Once the user completes modifying the diagrams, it may use, for example, SPARX EA, to export the design diagrams 112 to structured data files such as, but not limited to, Extensible Markup Language Metadata Interchange (hereafter "XMI") file, rich text file, and Hypertext Markup Language (hereafter "HTML") documents 112. In some implementations, an exemplary XMI-encoded file may take a form similar to the following:

```
<UML:TaggedValue tag="Host_Name"
xmi.id="EAID_647B4EF7_9864_40bc_BA1E_3B1F5D74E3CD"
value= "abc2.visa.com"
modelElement=
"EAID_2ADD1D1F_FDF8_4bd8_A98F_71234BF427A6"/>
<UML:TaggedValue tag="Host_Name"
xmi.id="EAID_647B4EF7_9864_40bc_BF5B_E80A28266C8B"
value= "abc1.visa.com"
modelElement= "EAID_4BB19667_1439_42b5_9893_0746F9913EF1"/>
<UML:TaggedValue tag="Host_Name"
xmi.id="EAID_647B4EF7_9864_40bc_A54B_78AB2590B34B"
value= "Itm.visa.com"
modelElement= "EAID_85BE06E5_CF7D_4949_9151_4C7F7AEC4562"/>
```

The structured data files may be further sent 113 to the IT-ID server via an exemplary XML-encoded message that may take a form similar to the following:

```
POST /exportedTemplate.php HTTP/1.1
Host: www.ITIDprocess.com
Content-Type: Application/XML
Content-Length: 624
<?XML version = "1.0" encoding = "UTF-8"?>
<infrastructure_template>
    <timestamp>2011-02-22 15:22:44</timestamp>
        <template_params>
            <template_ID>2475743543</template_ID>
            <template_lang>XMI</template_lang>
            <template_code>
                <UML:TaggedValue tag="Host_Name"
                xmi.id=
                "EAID_647B4EF7_9864_40bc_BA1E_3B1F5D74E3CD"
value= "abc2.visa.com" modelElement=
"EAID_2ADD1D1F_FDF8_4bd8_A98F_71234BF427A6"/>
                <UML:TaggedValue tag="Host_Name"
xmi.id= "EAID_647B4EF7_9864_40bc_BF5B_E80A28266C8B"
value= "abc1.visa.com"
modelElement=
"EAID_4BB19667_1439_42b5_9893_0746F9913EF1"/>
                <UML:TaggedValue tag="Host_Name"
xmi.id= "EAID_647B4EF7_9864_40bc_A54B_78AB2590B34B"
value= "Itm.visa.com"
modelElement=
"EAID_85BE06E5_CF7D_4949_9151_4C7F7AEC4562"/>
            </template_code>
        </template_params>
</infrastructure_template>
```

In some implementations the user may provide purchase request 114 via the client device 103 to the IT-ID server 105 for providing the infrastructure provisioning service, wherein the purchase request may comprise user credit card identification information, a payment amount, and/or the like. The IT-ID server 105 receives the purchase request information 114, and sends financial data 116 to a financial institution 115 to perform the financial transaction. Once the transaction is approved, a message is sent to the IT-ID server and purchase information may be displayed to the client device 118. The IT-ID server may also send a payment approval message 119 to the client device. In another implementation, the IT-ID server 105 may be integrated with a financial payment platform.

In some implementations, the client may generate a purchase request, e.g., 114, and provide the purchase request to the IT-ID server. For example, the client may provide a (Secure) Hypertext Transfer Protocol ("HTTP(S)") POST message including data formatted according to the eXtensible Markup Language ("XML"). Below is an example HTTP(S) POST message including an XML-formatted purchase request for the IT-ID server:

```
POST /userpurchase.php HTTP/1.1
Host: www.ITIDprocess.com
Content-Type: Application/XML
Content-Length: 624
<?XML version = "1.0" encoding = "UTF-8"?>
<user_purchase>
    <timestamp>2011-C2-22 15:22:44</timestamp>
        <user_params>
            <user_ID>12345</user_ID>
            <user_name>John Smith</user_name>
            <client_name>CompanyABC</client_name>
        </user_params>
        <user_account_params>
<account_issuer ID>12345rtyg</account_issuer_ID>
<account_issuer_name>Chaz Bank<account_issuer_name>
<account_name>John Smith<account_name>
<accout_type>credit<accout_type>
<account_num>1234567891011121<account_num>
        </user_account_params>
        <purchase_summary>
            <project_ID>1CB8A93F</project_ID>
            <project_name>New Software Testing</project_name>
            <project_duration>800 minutes</project_duration>
            <hardware>IBM Blade</hardware>
            <operating_system>Red Hat Linux 5.5.64bit</operating_system>
            <application>Websphere Application</application>
            <purchase_price>$5990</purchase_price>$
        </purchase_summary>
</user_purchase>
```

In some implementations, the IT-ID server 105 may parse the structure files (e.g., XMI) by a plurality of data tags 120. The parsed XMI data file may be sent 121 to any compute services, infrastructure provisioning tools, infrastructure ordering tools, or any infrastructure interfaces such as, but not limited to, BMC Cloud Lifecycle Management (hereafter "BMC CLM") 122.

In some implementations, the infrastructure interface 122 may send a request to the infrastructures 124 to map the topology of infrastructures 123. The infrastructures 124 may then map the topology 125 and send the topology mapping data back to the infrastructure interface 126. The infrastructure interface 122 may correlate the topology mapping data with the parsed XMI file 127 and determine if the requested infrastructures are available to the user. If the requested infrastructures are available, the requested infrastructures may be allocated to the client device and a successful infrastructure delivery message may be send to the client device 128.

Figure 1C:
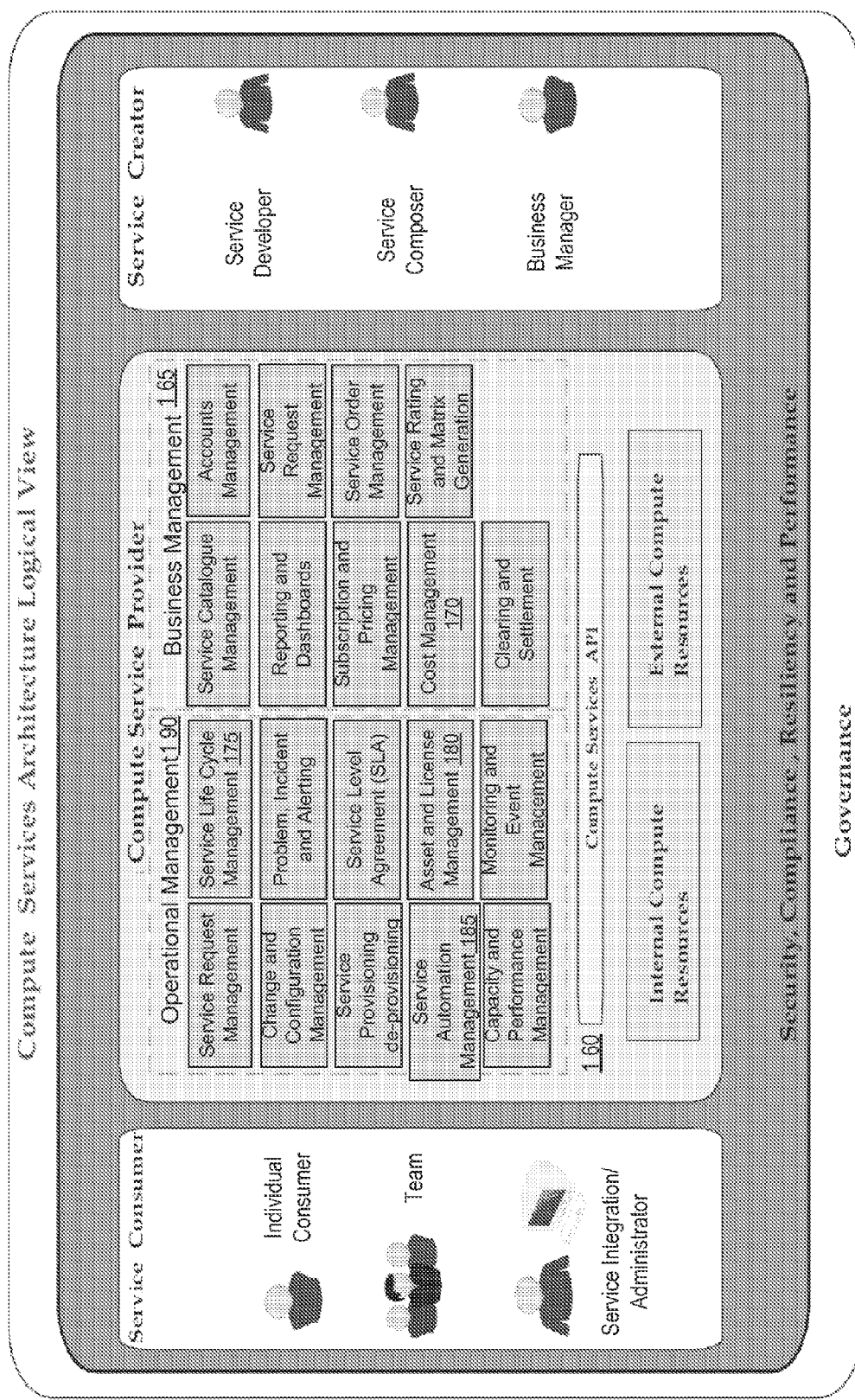
FIGS. 1C and 1D show diagrams illustrating allocating resources for different areas of a user's enterprise using the IT-ID.
Figure 1D:
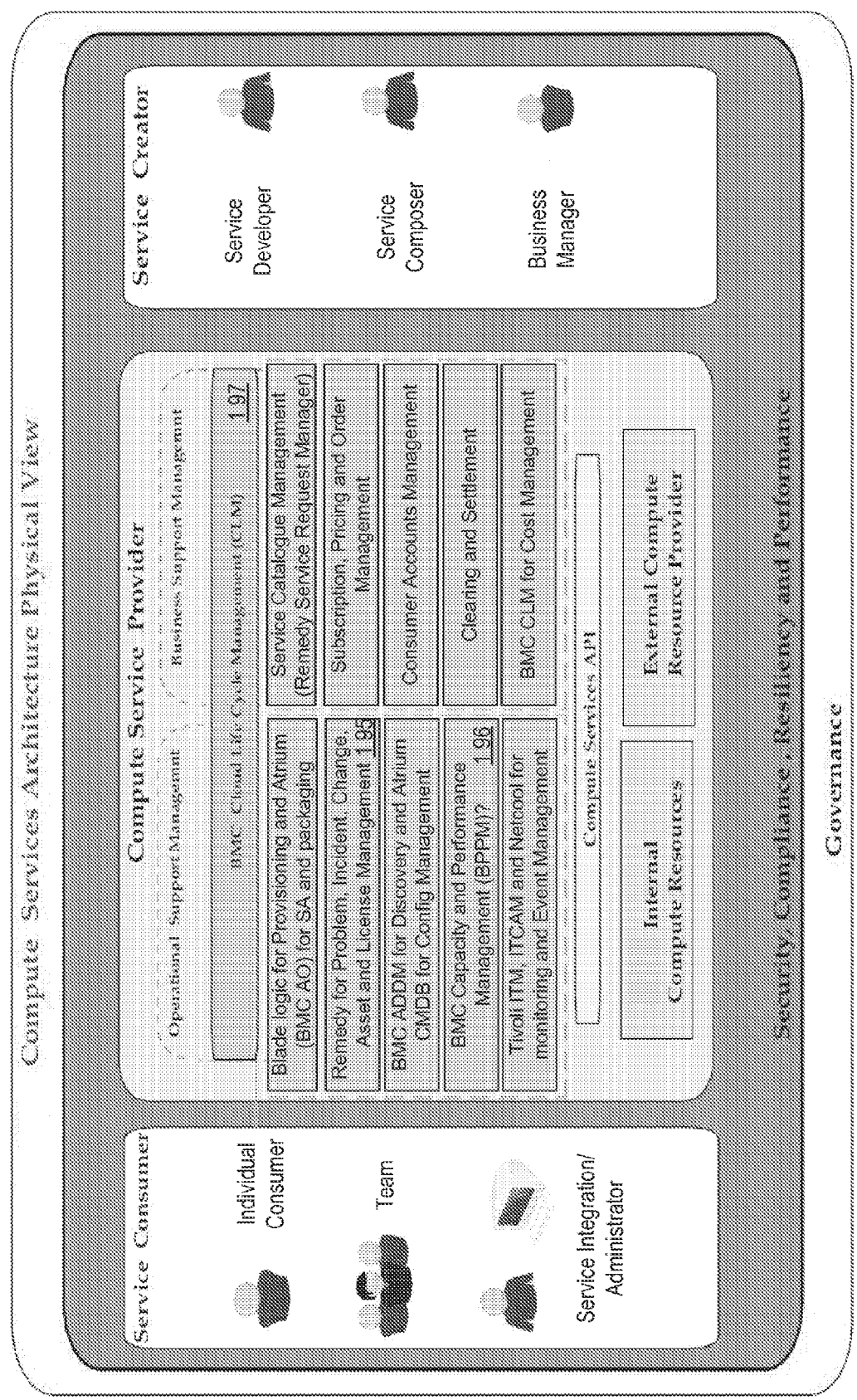

FIGS. 1C and 1D show diagrams illustrating allocating resources for different areas of a user's enterprise. In some implementations, the IT-ID may provide APIs 160 that allow organizational business units to access and use IT-ID to access infrastructure and/or determine available resources. The user may provide lists to IT-ID in order to better allocate available resources and to provide outputs to the organizational business units which may include resources, information (e.g., account information) and/or the like.

As an example, the APIs may interface with any number of Business Management units 165, which may provide input (e.g. caps) on infrastructure. For example, a Cost Management unit 170 may modify templates to limit a Service Life Cycle Management unit 175 to $30,000 in infrastructure (e.g., due to budget constraints, projected earnings, and/or the like). Also, an Asset and License Management unit 180 may provide the IT-ID with a list of unused software licenses, which the IT-ID may use for allotting resources when users in a Service Automation Management unit 185 request infrastructure. Additionally, in the event that the Service Automation Management unit does not meet the criteria of the most relevant template (e.g., the Service Automation Management unit requests the use of Microsoft Server licenses for three users, when the template requires at least five licenses to be used in order to save revenue and/or a like rationale), the IT-ID may provide recommendations to the unit based on the unit's constraints (e.g., to use software with free licenses such as Apache, and/or is otherwise cost-effective given the quantity requested by the unit, and/or the like), and may update a template specific to the unit reflecting the accepted recommendation.

In some implementations, the IT-ID may further be utilized to provide allocation errors and/or the like to the user or to any of the Operational or Business Management units. For example, the IT-ID may send any errors that occur as a result of a unit requesting too many resources to a Remedy for Problem, Incident, Change, Asset and License Management unit 195. In some implementations, the IT-ID may send errors in the form of a notification to the Remedy for Problem, Incident, Change, Asset and License Management unit, noting the request and the extent to which the request exceeds the limits placed on the unit, and may request that the Remedy for Problem, Incident, Change, Asset and License Management unit either deny or allow the request.

In some implementations, the user may wish to allocate different resources to different areas of the user's enterprise, based on a variety of factors. For example, in some implementations, operational management areas 190 may receive a different set of resources than business management areas 165. As an example, in some implementations, the BMC Capacity and Performance Management unit 196 of the enterprise may require more resources than the Service Automation Management unit 185, may require internal resources as opposed to external resources, or may have certain resource restrictions placed upon it via a Cloud Life Cycle Management (CLM) system 197, which may place such restrictions based on the size of the module, the finances associated with the module, and/or the like 170. In such cases, the IT-ID may use the Compute Services API 160 to generate or update the templates in order to accommodate differences in needs between all areas of the enterprise.

Figure 2A:
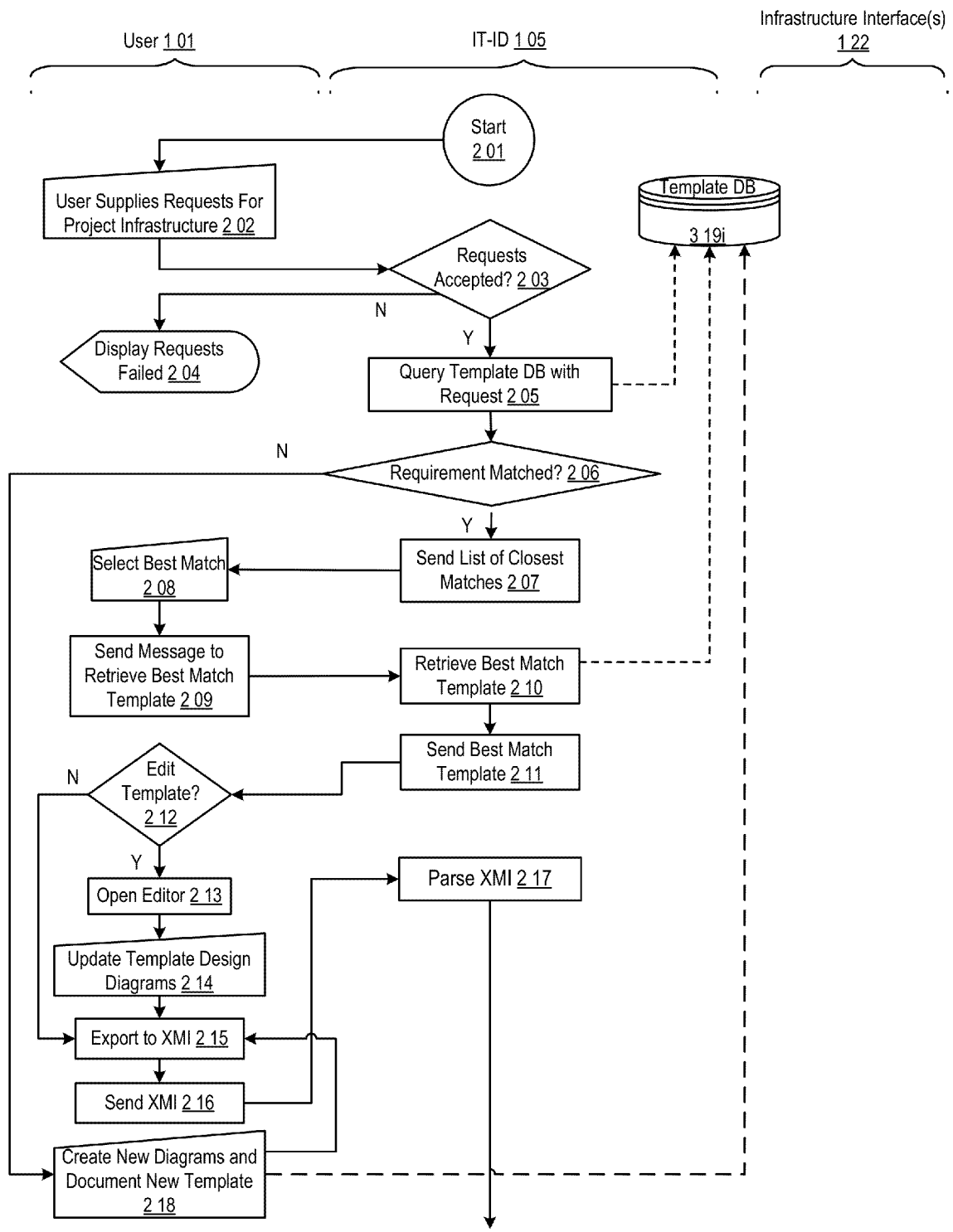
FIG. 2A-C show logic flow diagrams illustrating embodiments of the IT-ID.
Figure 2B:
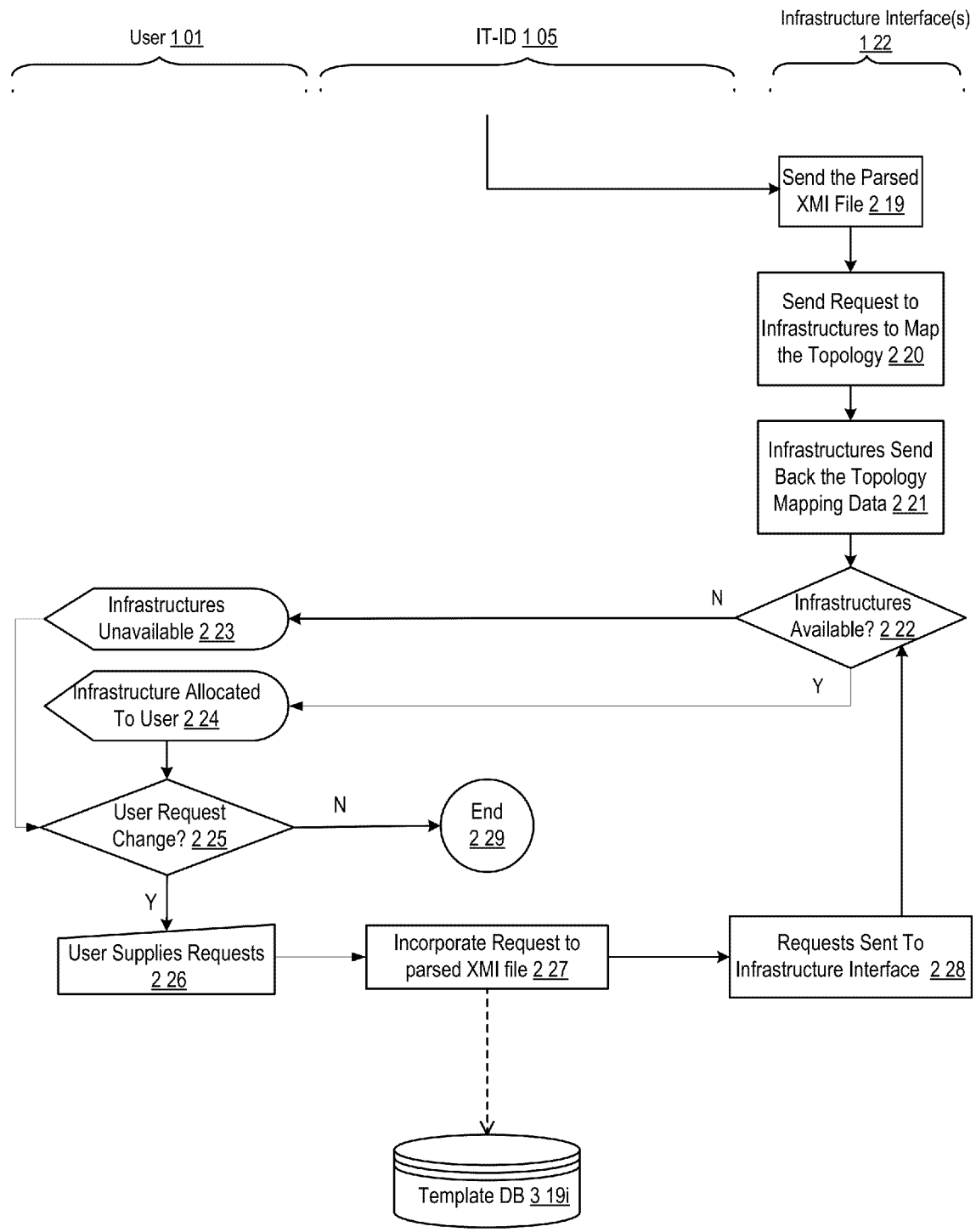

FIG. 2A and FIG. 2B show logic flow diagrams illustrating embodiments of the IT-ID. In some implementations, the infrastructure is designed and provisioned automatically based on the user's project requirements. For example, in some implementations, a user 101 may initiate a project by submitting project infrastructure requirements 202 and sends the request to the IT-ID 105. It the IT-ID refuses the request, a request failed message is displayed to the user 204. If the IT-ID accepts the request 203, the IT-ID may query the user's project infrastructure request with pre-defined templates stored in the Template Database 719i.

In some implementations, if a match is identified, the IT-ID server may send a list of templates that are closet to the user's project infrastructure request 207. The user may select a best match from the templates sent 208. The user may further send a message to the IT-ID server to request to retrieve the best match template 209. The IT-ID server may retrieve the best match template 210 from the Template Database 319i and send the best match template back to the user 211.

If the user desires to edit the template 212, a template editor may be opened 213 and the user may provide changes to the template and complete a design diagram 214 via hand-made or automated modeling tools.

In some implementations, the user may export the updated design diagram 215 to structured data files such as, but not limited to, XMI file, rich text file, JSON, and HTML documents. The user may further send the structured data files (e.g., XMI) to the IT-ID server 216. The IT-ID server may then parse the structured data files by a plurality of data tags 217. In some implementations, the IT-ID may use a JSON parser to parse the file; in some implementations, the JSON-encoded command for parsing the file may take a form similar to the following:

```
var http_template = new XMLHttpRequest( );
http_request.open("POST", url, true);
JSON.parse(http_template.responseText);
```

The parsed XMI file may further be sent to any compute services, infrastructure provisioning tools, infrastructure ordering tools, or any infrastructure interfaces such as, but not limited to, BMC Cloud Lifecycle Management (hereafter "BMC CLM") 219.

In some implementations, if the match between the user's requirements and pre-defined templates is not identified 206, a notification may be sent to the user and the user can create new design diagrams for the project 218 using either handmade tools (e.g., SPARX EA) or automatic tools, and further export the diagrams 215 to structured data files. The newly created diagram may be documented, sent to the Template Database 719i, and stored. The user may further send the structured data files (e.g., XMI) to the IT-ID server 216. The IT-ID server may then parse the structured data files by a plurality of data tags 217. The parsed XMI file may further be sent to any compute services, infrastructure provisioning tools, infrastructure ordering tools, or any infrastructure interfaces such as, but not limited to, BMC Cloud Lifecycle Management (hereafter "BMC CLM") 219.

In some implementations, the infrastructure interface may request to map the topology of the infrastructure resources 220 and correlate the topology mapping data with the parsed XMI file 221 to determine if the available infrastructure resources are sufficient for the user's requirements 222. If the infrastructure resources are available, the infrastructure resources may be allocated 224 to the user.

In some implementations, the infrastructure interface may directly process the parsed data without mapping the topology and allocate the infrastructure resources to the user.

In some implementations, if the infrastructure resources are unavailable 223, a notification may be sent to the user and requires the user to change the request 225

In some implementations, if the user requests changes 225 to the infrastructure that was previously allocated 224, modifications based on the new requirements that the user provides 226 may be incorporated to the data file that was sent to the infrastructure provider 227. The modified data file is submitted to the infrastructure interface 228. If the requested infrastructure resources are available 222, new infrastructure resources may be allocated 224 to the user.

The modified data file may be version controlled and stored in template database 319i.

Figure 2C:
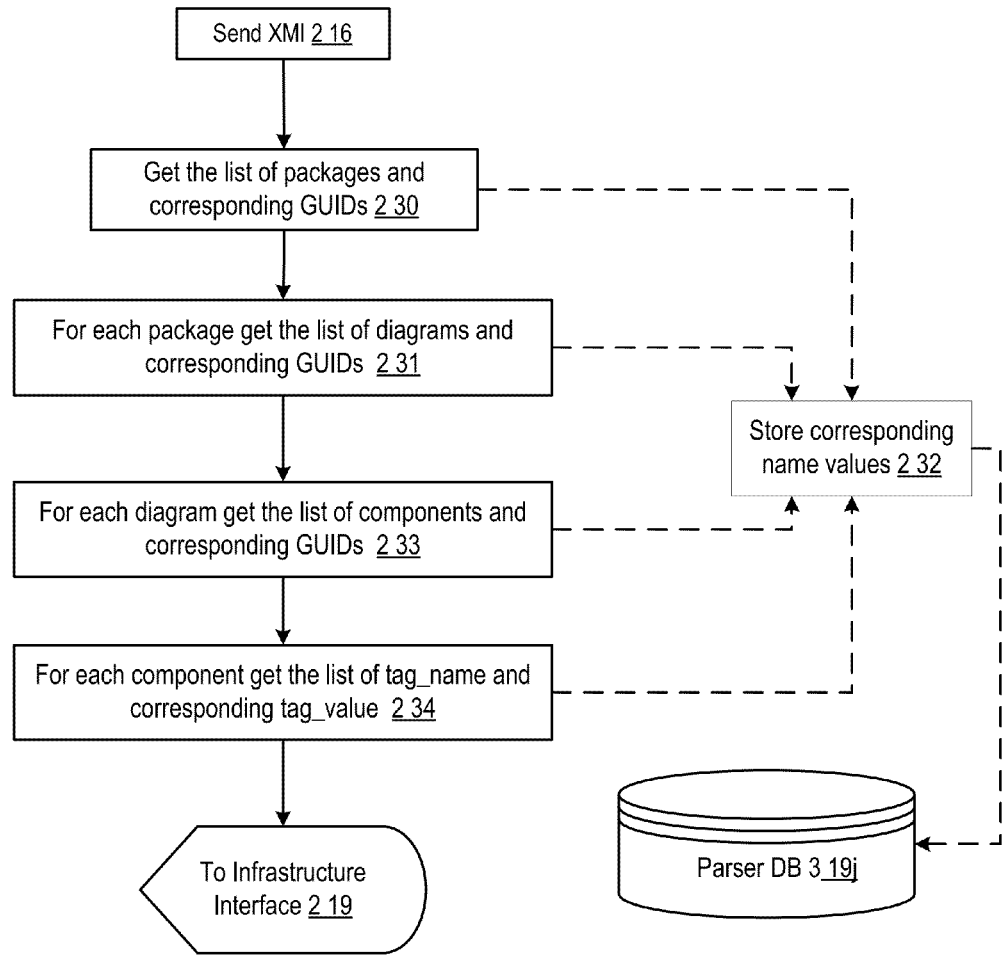

FIG. 2C shows a logic flow diagram illustrating embodiments of the XMI parser. In some implementations, the XMI file may be sent from the infrastructure design diagrams 216. The XMI file may contain a plurality of data tags. The list of packages and corresponding system generated Globally Unique Identifiers (hereafter "GUIDs") may be obtained 230. For each package, the list of the infrastructure design diagrams and corresponding GUIDs may be obtained 231. For each diagram, the list of the components and corresponding GUIDs may be obtained 233. For each component, the list of tag_name and corresponding tag_value may be obtained 234. The foregoing name values may be stored 232 in a Parser Database 319j. The parsed data file may be sent to any infrastructure interface 219.

Figure 3:
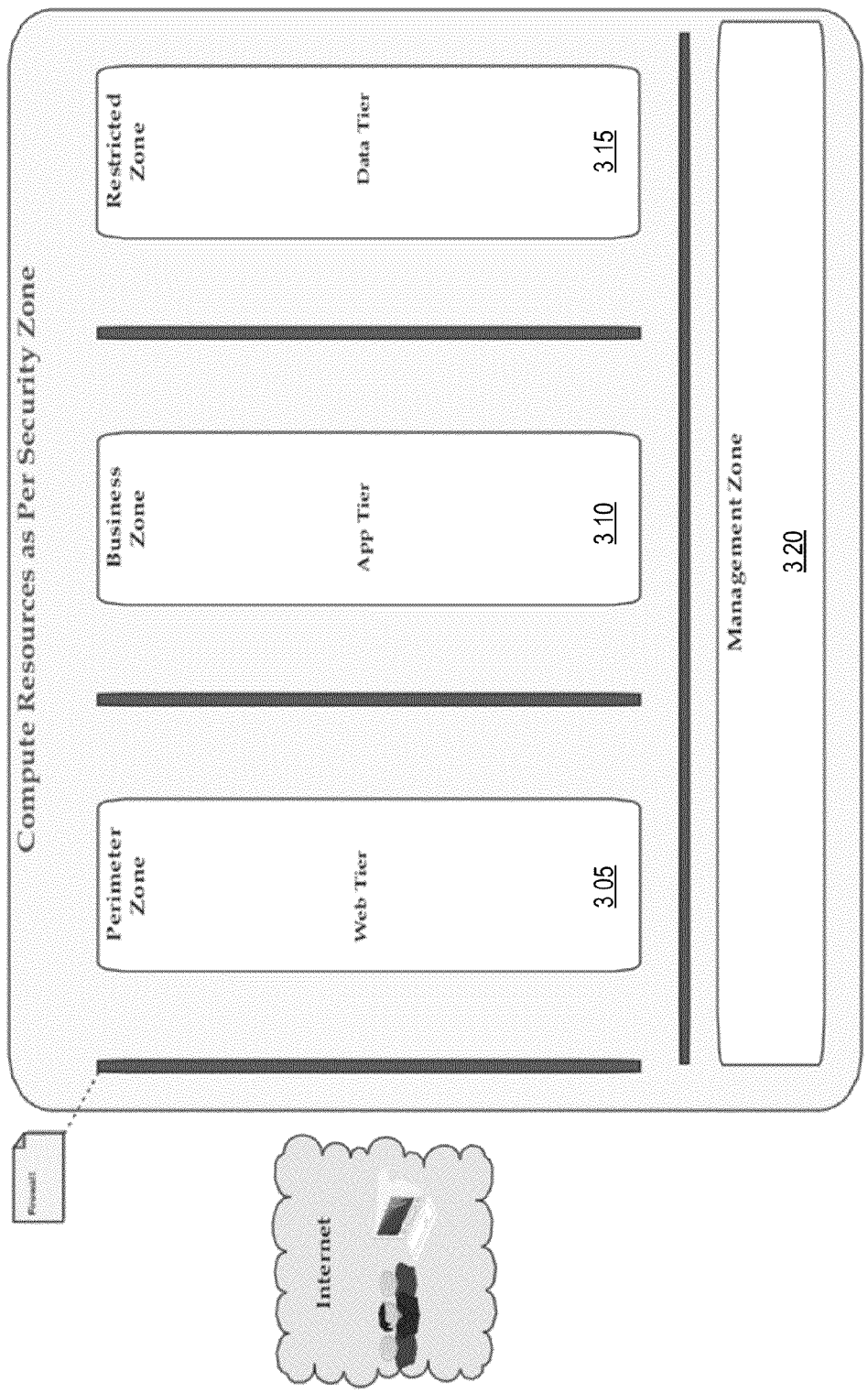
FIG. 3 shows a diagram illustrating separating resources using the IT_ID.

FIG. 3 shows a diagram illustrating separating resources using the IT_ID. In some implementations, the user may divide resources based on different intentions of use, and/or the like. For example, a Perimeter Zone 305 may involve resources related to a web interface and/or other externally-viewed data. A Business Zone 310 may involve resources related to any underlying software for the web interface, including any software to process the data collected by the web interface, and/or the like. A Restricted Zone may involve resources related to any data (sensitive or otherwise) that may be collected and processed within the Perimeter Zone or Business Zone. Finally, a Management Zone 320 may involve resources related to facilitating communication between the various other zones, to dynamically and/or automatically changing allocation of resources within each zone and/or across zones, and/or the like. In some implementations, each zone may be separated by a firewall for extra security, and/or to prevent data, resources, and/or the like from being shared across zones.

FIGS. 4A-4D show screenshot diagrams illustrating example embodiments of a template in the IT-ID. In some implementations, the template may be a pre-compiled questionnaire, form, and/or the like which asks the user for resource estimates specific to a task the user has previously specified that the resources will be used for.

Figure 4A:
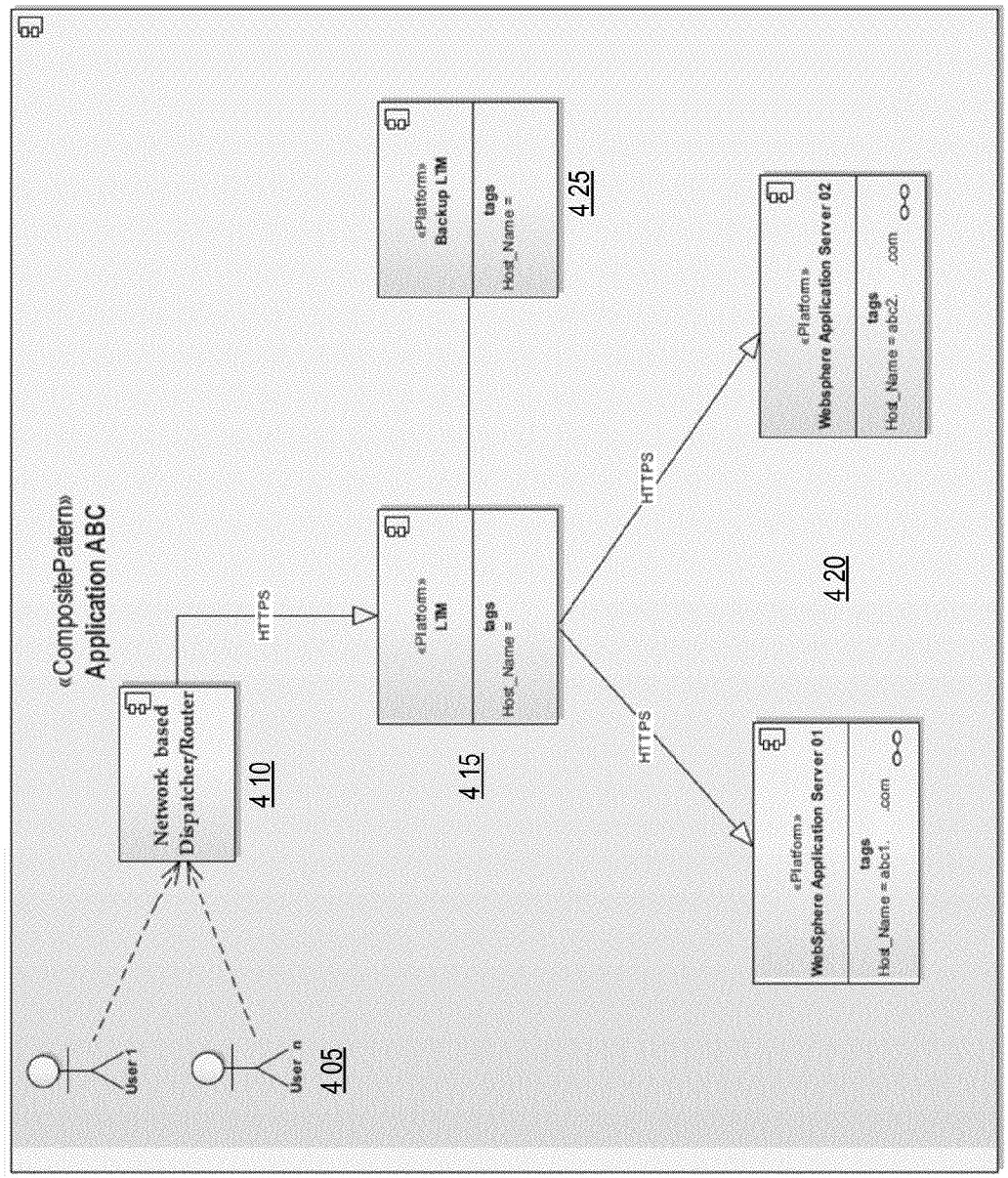
FIGS. 4A-4D show screenshot diagrams illustrating example embodiments of a template in the IT-ID.

In some implementations, as shown in FIG. 4A, a template may be an editable flow chart diagram where users may specify various aspects of the infrastructure desired. In some implementations, the template may be for an application (e.g., FIG. 4A indicates that the template is for "Application ABC"); however, other implementations may use templates for web hosting infrastructure, for internal business server infrastructure, and/or the like. In some implementations, the user may specify the number of separate user entities 405 that may access the system and thus affect resource usage. The user may also specify a network router and/or like device 410 through which to communicate with the various infrastructures within the template. The user may specify how the router communicates with the rest of the infrastructure (e.g., HTTP(s) messages). The user may specify platforms 415 (e.g., servers, clusters, and/or the like) to utilize, as well as sub-platforms 420 that may communicate with main platform 415. In some implementations, the user could have multiple main platforms with multiple sub-platforms; in some implementations, the limitations on the number of main or sub-platforms may depend upon the internal and/or resources available for the particular project. In some implementations, the user may also specify how the main and sub-platforms communicate with each other (e.g., the protocols used, the language used for communication, and/or the like). In some implementations, the user may specify HTTP or HTTPS protocol for platforms. In some implementations, the user may also specify backup platforms 425, and/or the like. In some implementations, all platforms, components, and/or the like may be implemented within each template as data objects (e.g., XMI data objects and/or the like), with data structures as described above which may be pre-configured to communicate with other platforms, components, infrastructures, and/or the like.

Figure 4B:
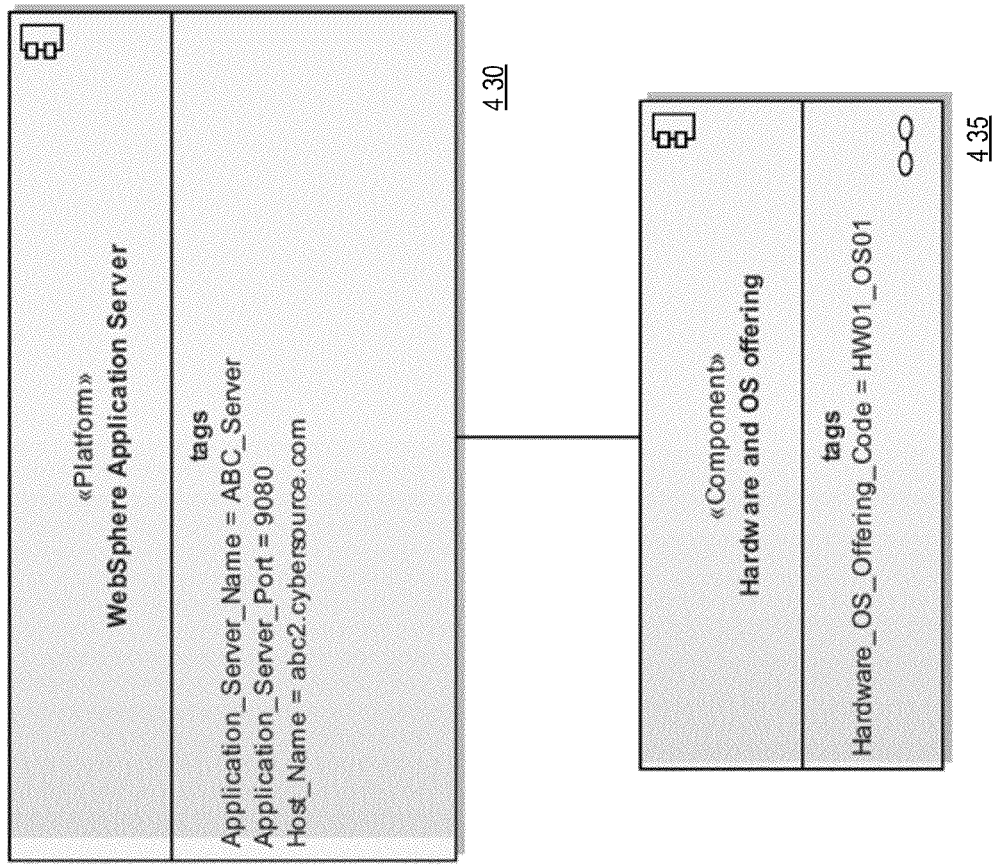
Figure 4C:
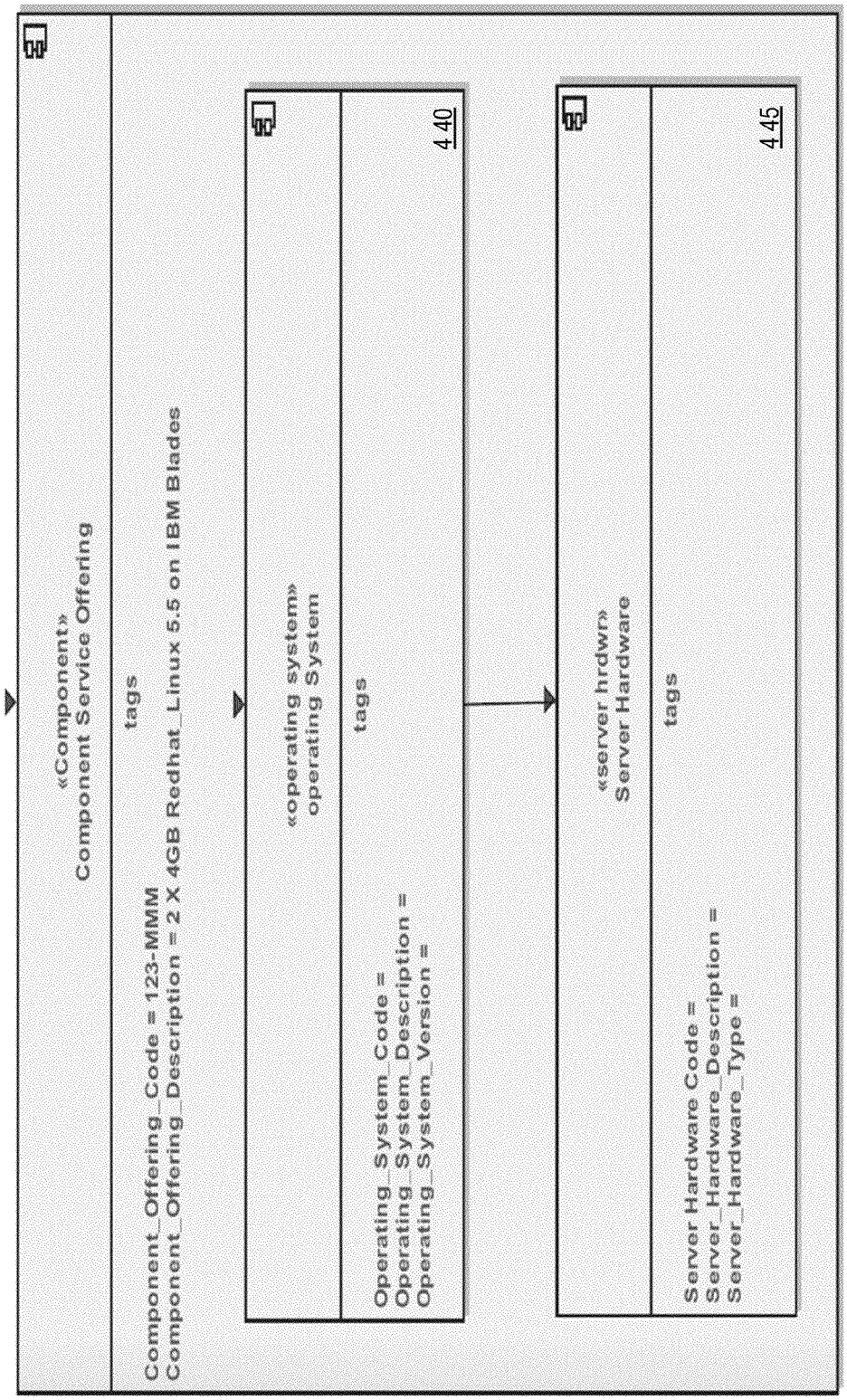

In some implementations, as shown in FIG. 4B, the user may be able to specify a plurality of parameters for each main or sub-platform added to the template. For example, the user may be able to specify properties of the platform such as its name, the port that it communicates on, the name of the platform's host, and/or the like 430. The user may also be able to specify any components to the platform 435, such as the operating system type and/or version to be utilized on the platform 440 (e.g., Windows Server, Linux, and/or the like), the hardware to be used for the platform 445 (e.g., type of processors, quantity of processors, amount of memory, amount and type of storage, and/or the like), and/or like attributes, as shown in FIG. 4C.

Figure 4D:
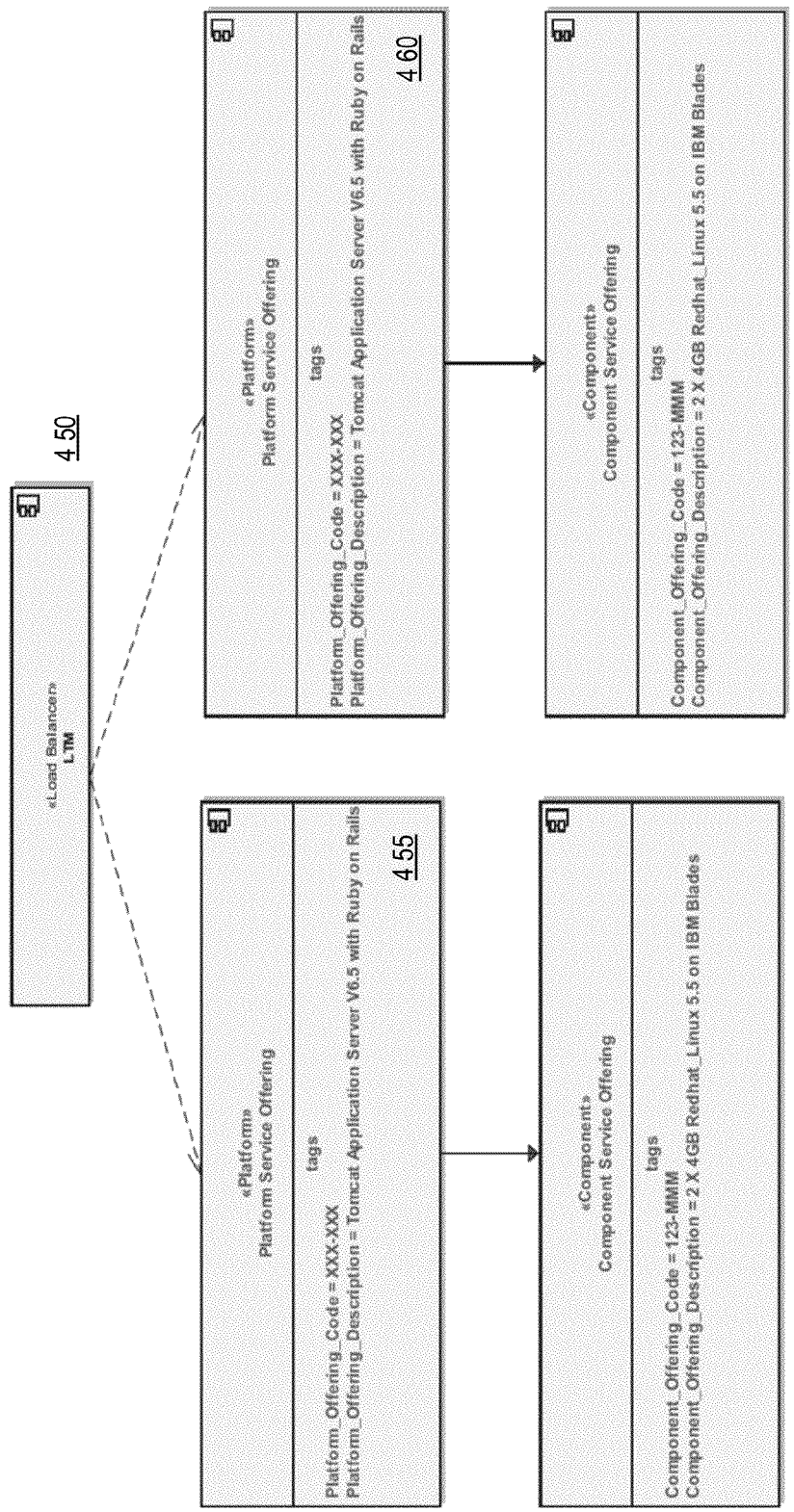

In some implementations, as shown in FIG. 4D the user may also be able to use a Load Balancer 450 to ensure that platforms use equal proportions of the total resources, or to compensate for any need for more resources as a result of changes the user makes to the template, and/or the like. For example, in some implementations, the user may specify platform 455 with a particular component, development environment, and/or the like. The Load Balancer, in some implementations, may automatically load other platforms 460 and may allow the user to view estimates of the amount of resources each platform would require, in order to allow the user to ensure that adding the new platform 455 would not add too many resources, in order to make sure the proportion of resources going towards the unit using 455 is appropriate given the proportion of resources going towards the unit using 460, and/or the like. In some implementations, platform 460 may be a platform that the Load Balancer automatically generates if the IT-ID determines that platform 455 is not sufficient for the needs the user specified earlier for a particular unit.

Figure 5:
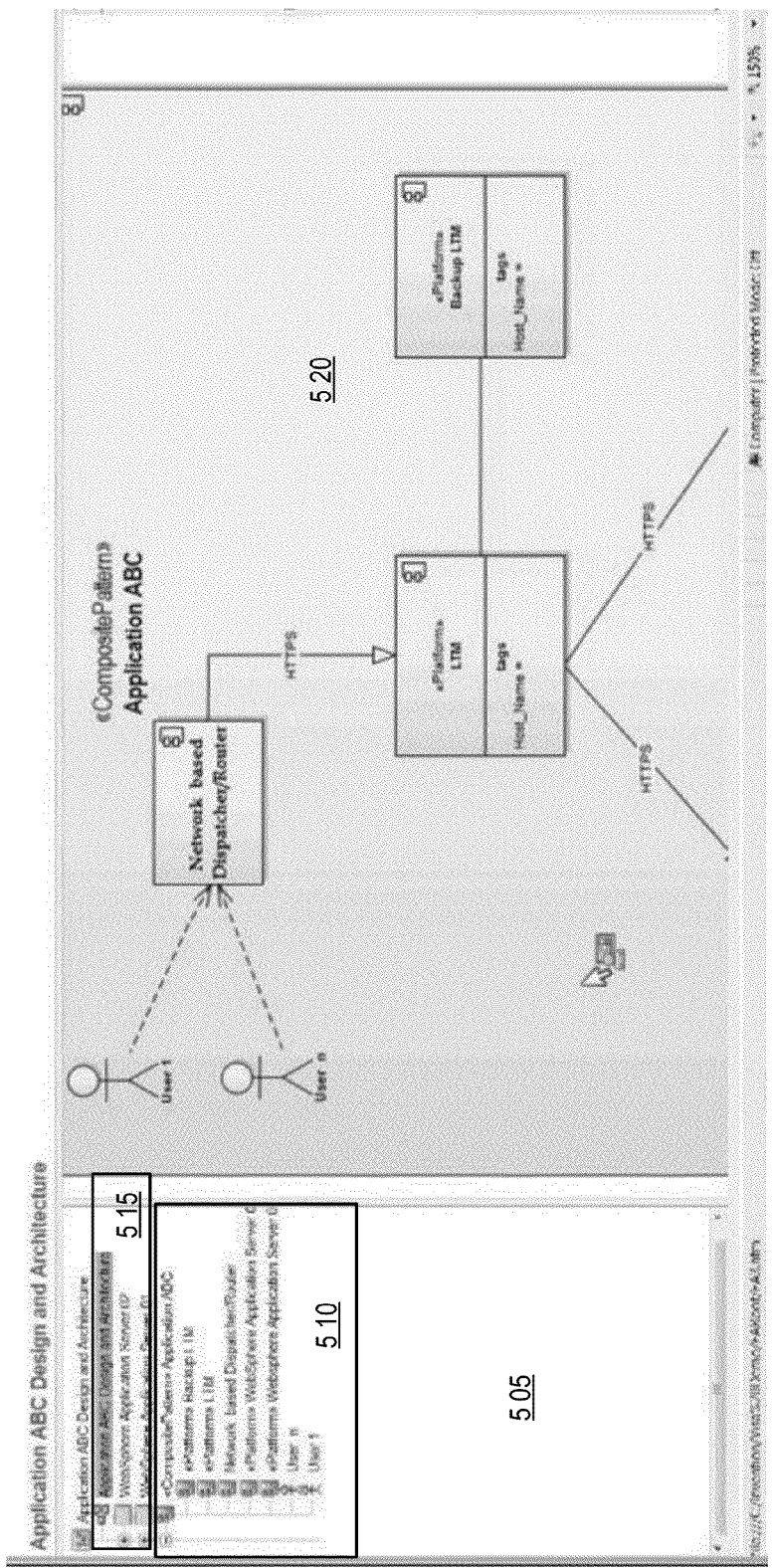
FIG. 5 shows a screenshot diagram illustrating example embodiments of the IT-ID interface.
Figure 6A:
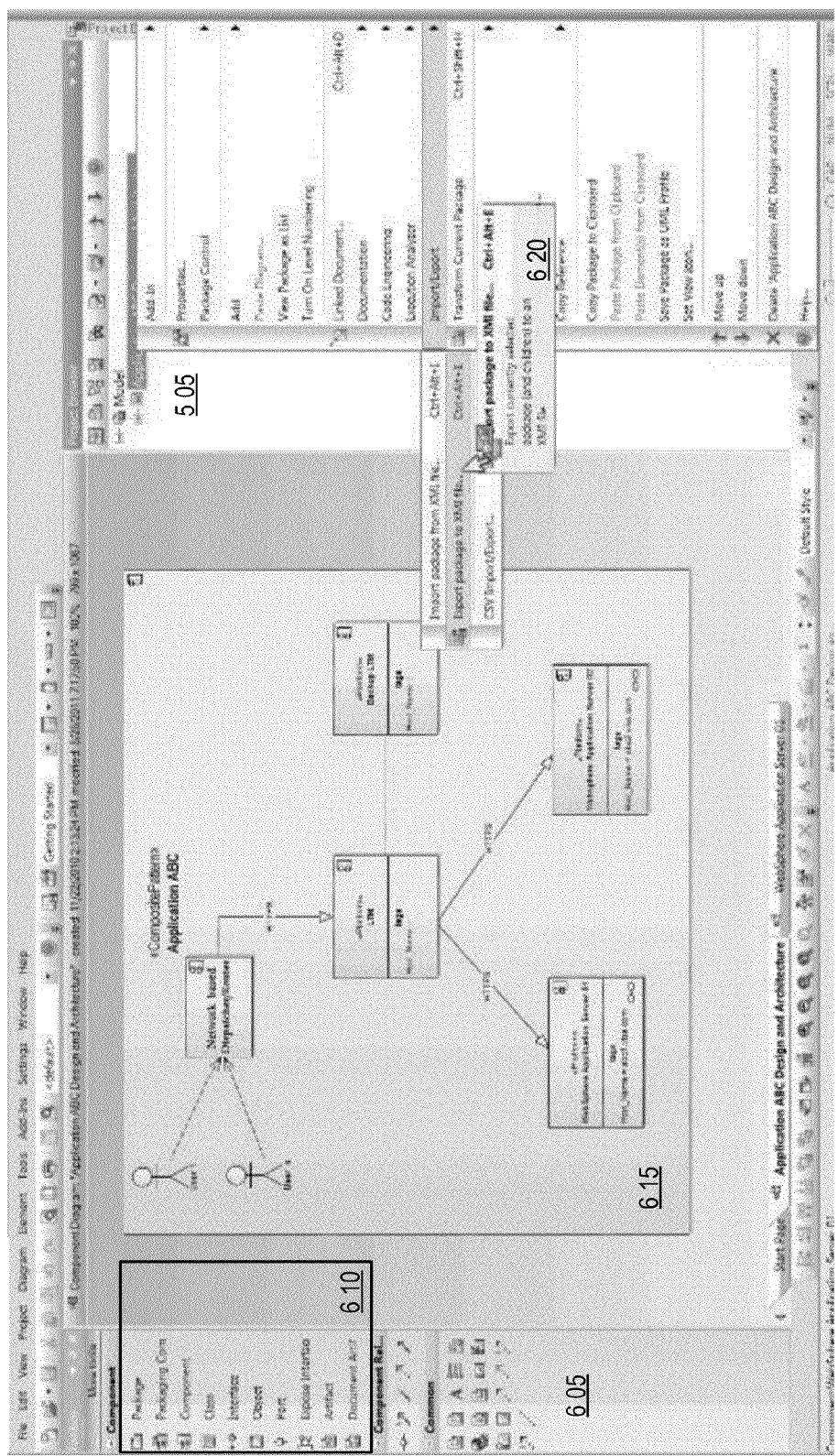
FIGS. 6A-6E show screenshot diagrams illustrating example embodiments of the IT-ID interface.
Figure 6B:
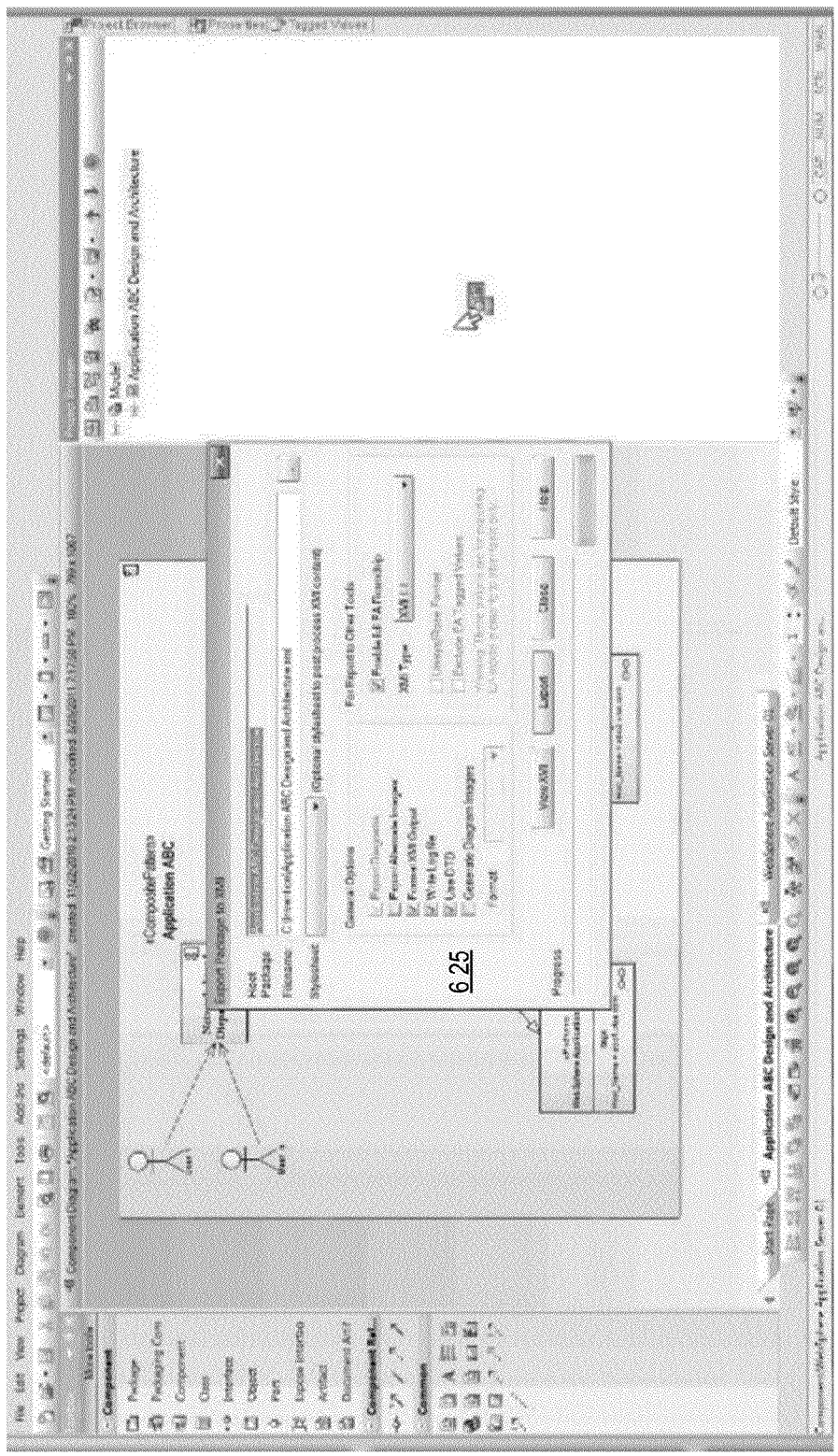
Figure 6C:
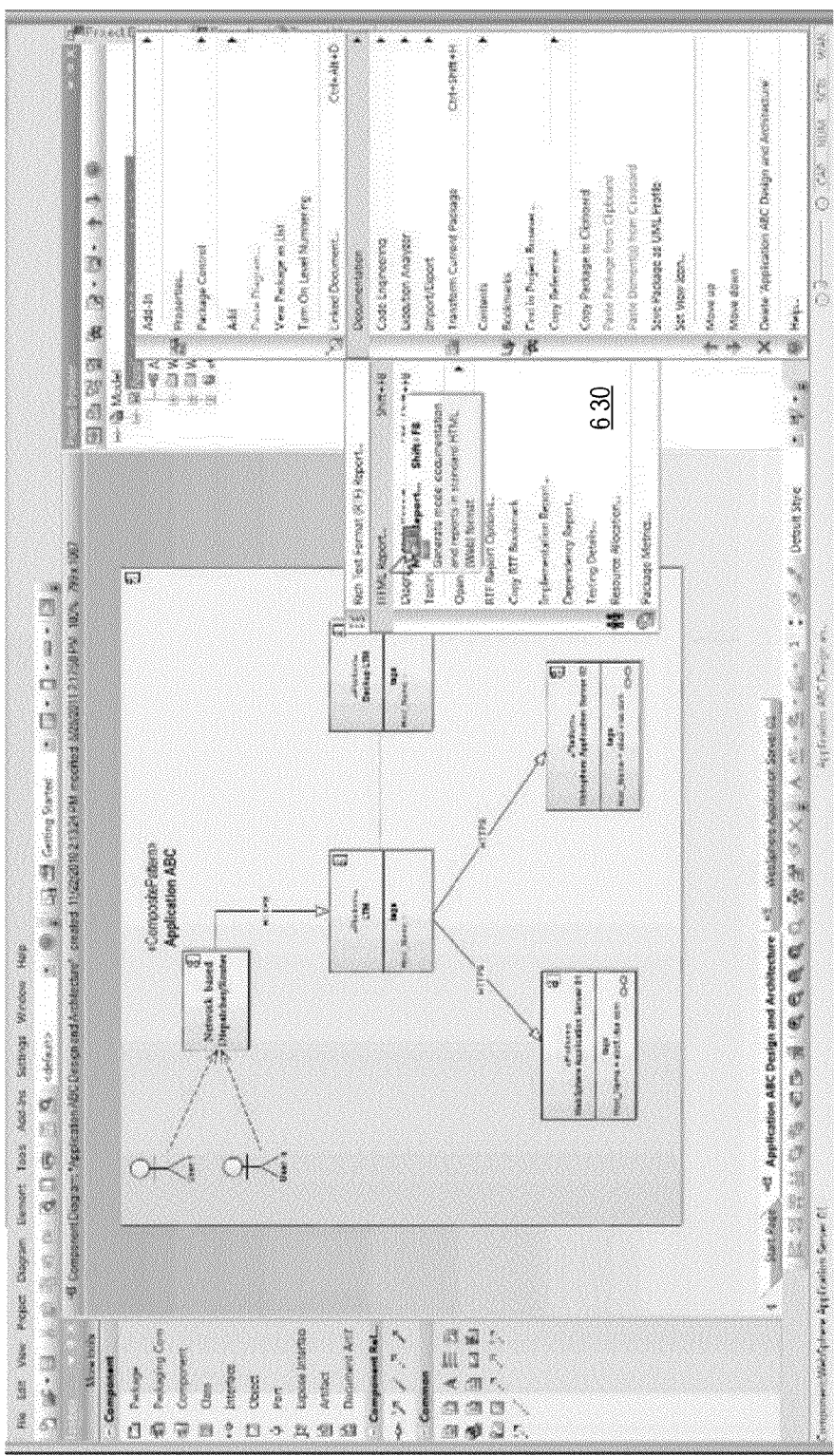
Figure 6D:
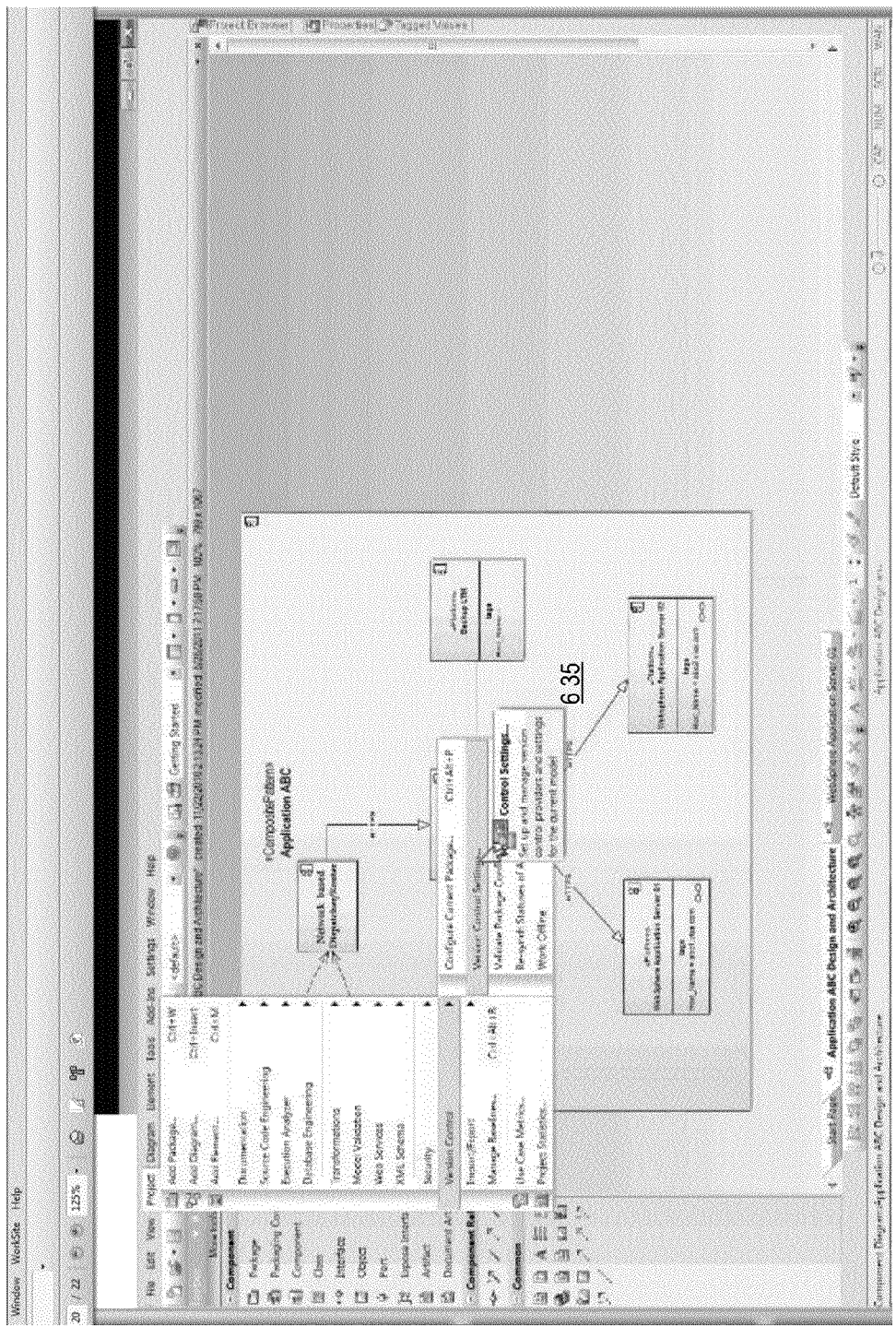
Figure 6E:
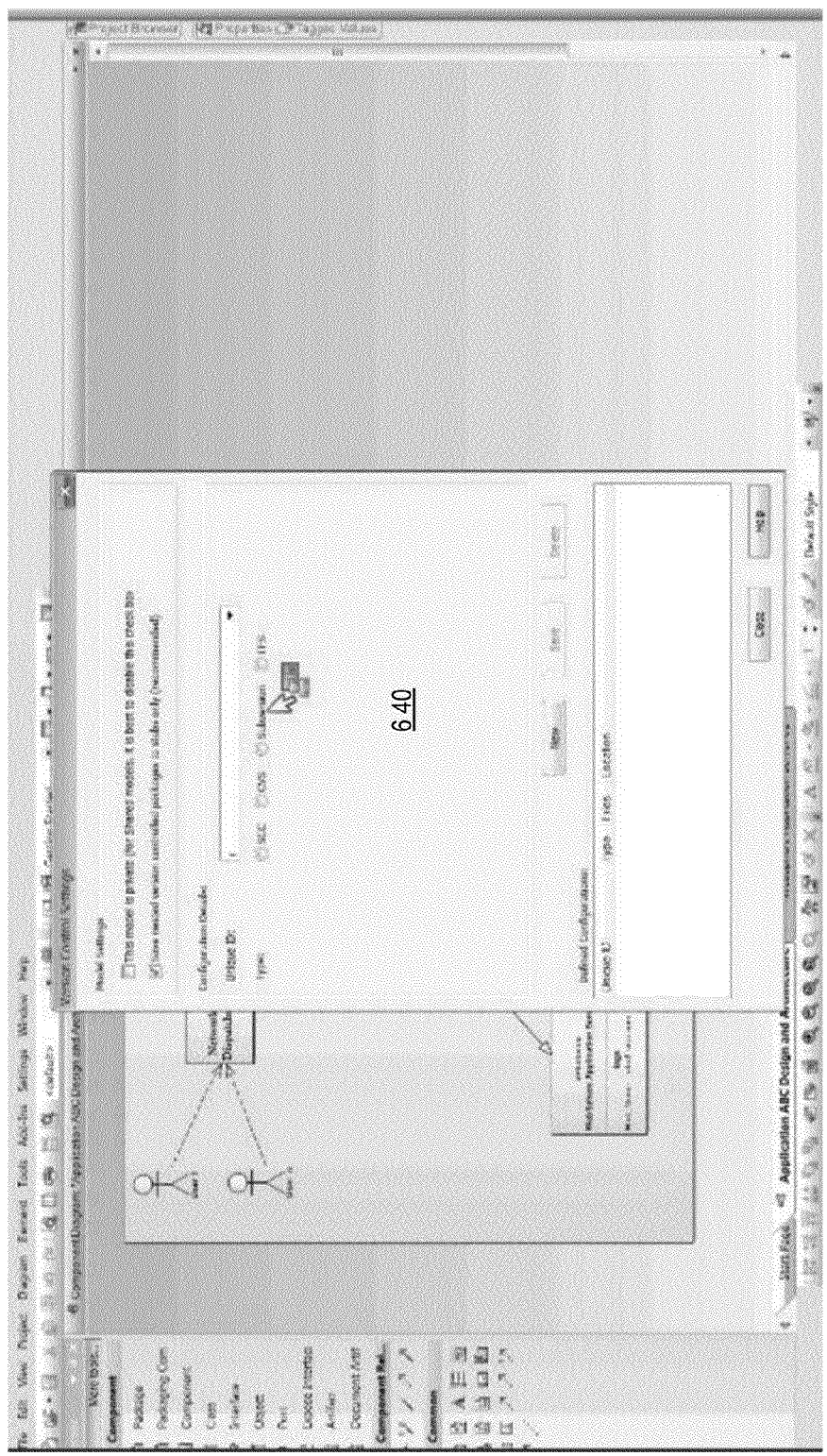

FIG. 5 shows a screenshot diagram illustrating example embodiments of the IT-ID interface. In some implementations, a panel 505 may contain a running list of all platforms and/or related components in the template 510. The panel may also contain a list of object libraries 515 being incorporated into the template in order to describe the operational detail behind each useable platform, component, and/or the like. In some implementations, each template may be pre-loaded with a standard set of libraries, and may also be loaded with libraries specific to the particular type of infrastructure. In some implementations, the user may be able to import libraries from the IT-ID into a particular template during the process of modifying the template. The interface may also include a work area 520, which includes the template and where users may re-arrange aspects of the template diagram and/or edit information pertaining to all platforms and/or components in the diagram.

FIGS. 6A-6E show screenshot diagrams illustrating example embodiments of the IT-ID interface. In some implementations, the user may use a toolbar 605 to add platforms, components, attributes, and/or the like to the template in the workspace 615. In some implementations, the user may specify some of the underlying software, code, and/or parameter values within each platform, component, and/or the like, such as editing the data objects that each platform represents, creating new data objects and classes representing new infrastructure not included in the template, specifying different forms of communication between components and/or platforms (e.g., changing the ports they communicate on, and/or the like), and/or like modifications. In some implementations, the user may be able to edit the template using the template workspace. In some implementations, the user may also be able to export the template to an XMI file 620 by right-clicking the template file in panel 505. Exporting the template may provide a prompt 625 (see FIG. 6B) to the user, which may provide a set of options to choose from (e.g., formatting the XMI output, writing log files, generating diagram images in various formats, specifying a filename, and/or the like). The user may also be able to generate documentation and reports 630 (see FIG. 6C) for the edited template. In some implementations, the reports may be generated in standard HTML format, plain text format, and/or a like format. In some implementations, a report may include any special considerations that may need to be taken into account (e.g., if the user is requesting more resources than the user's unit limit allows, and/or the like), any errors that have occurred through the process of creating the template, and/or the like. Additionally, a report may be a textual representation of the infrastructures requested (e.g., a list of resources needed, a set of cost estimates for the infrastructures described in the template, and/or the like). The user may also be able to save the template using various forms of version control 635 (see FIG. 6D). Version control features may allow users to identify when and how often a template has been modified, by whom it was modified, the nature of the modifications, and/or the like. In some implementations, the user may be able to specify the type of version control to use 640 (e.g., SCC, CVS, Subversion, TFS, and/or the like; see FIG. 6E). The user may also be able to specify other options for version control, such as sharing/privacy options, the types of files to be saved under version control, and/or the like.

IT-ID Controller

Figure 7A:
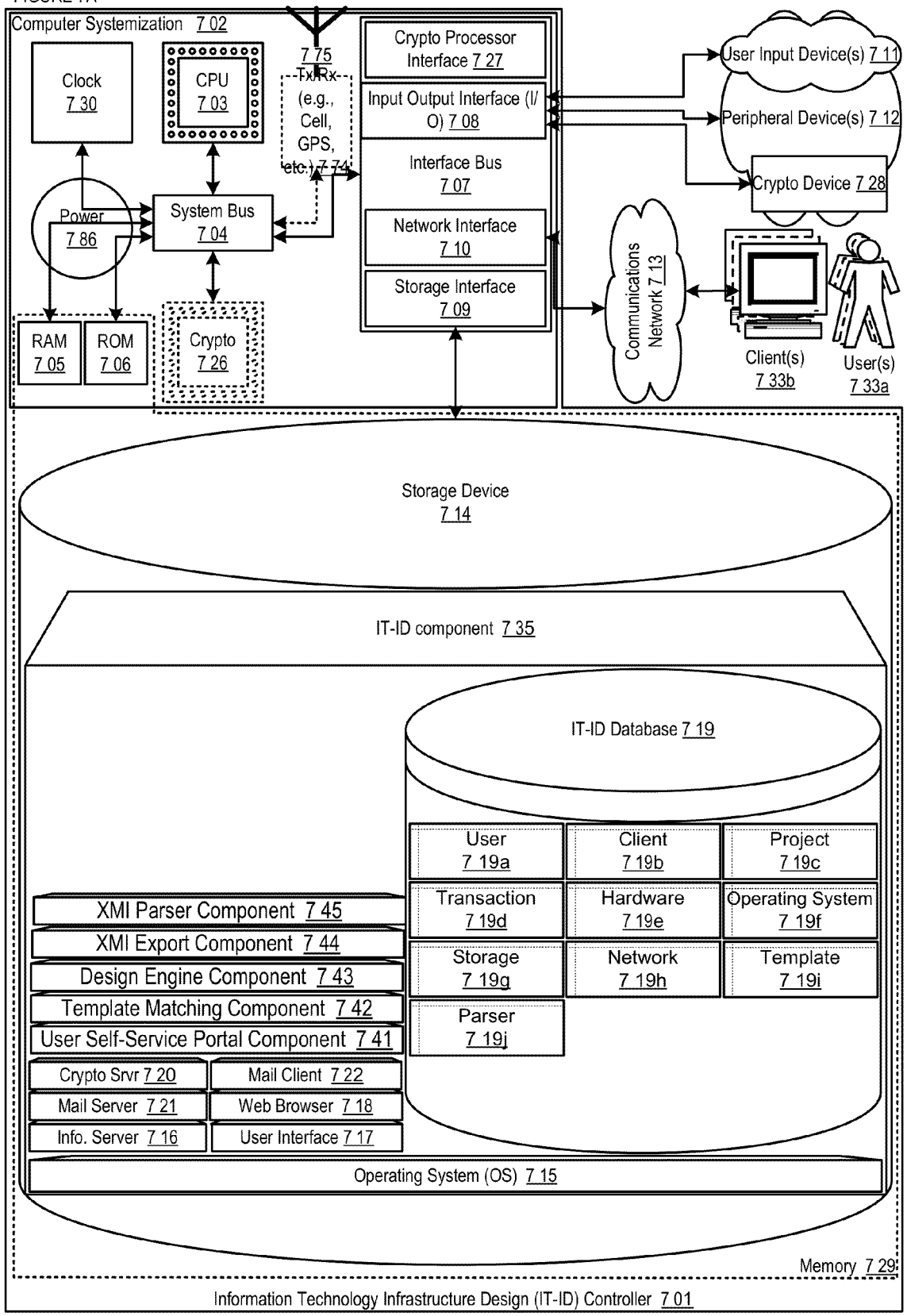
FIG. 7A shows a block diagram illustrating embodiments of an IT-ID controller.

FIG. 7A shows a block diagram illustrating embodiments of an IT-ID controller. In this embodiment, the IT-ID controller 701 may serve to aggregate, process, store, search, serve, identify, instruct, generate, match, and/or facilitate interactions with a computer through infrastructure design technologies, and/or other related data.

Typically, users, which may be people and/or other systems, may engage information technology systems (e.g., computers) to facilitate information processing. In turn, computers employ processors to process information; such processors 703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the IT-ID controller 701 may be connected to and/or communicate with entities such as, but not limited to: one or more users from user input devices 711; peripheral devices 712; an optional cryptographic processor device 728; and/or a communications network 713.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The IT-ID controller 701 may be based on computer systems that may comprise, but are not limited to, components such as: a computer systemization 702 connected to memory 729.

Computer Systemization

A computer systemization 702 may comprise a clock 730, central processing unit ("CPU(s)" and/or "processor(s)" (these terms are used interchangeably throughout the disclosure unless noted to the contrary)) 703, a memory 729 (e.g., a read only memory (ROM) 706, a random access memory (RAM) 705, etc.), and/or an interface bus 707, and most frequently, although not necessarily, are all interconnected and/or communicating through a system bus 704 on one or more (mother)board(s) 702 having conductive and/or otherwise transportive circuit pathways through which instructions (e.g., binary encoded signals) may travel to effectuate communications, operations, storage, etc. The computer systemization may be connected to a power source 786; e.g., optionally the power source may be internal. Optionally, a cryptographic processor 726 and/or transceivers (e.g., ICs) 774 may be connected to the system bus. In another embodiment, the cryptographic processor and/or transceivers may be connected as either internal and/or external peripheral devices 712 via the interface bus I/O. In turn, the transceivers may be connected to antenna(s) 775, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing IT-ID controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 729 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the IT-ID controller and beyond through various interfaces. Should processing requirements dictate a greater amount speed and/or capacity, distributed processors (e.g., Distributed IT-ID), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the IT-ID may be achieved by implementing a microcontroller such as CAST's R8051XC2 microcontroller; Intel's MCS 51 (i.e., 8051 microcontroller); and/or the like. Also, to implement certain features of the IT-ID, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the IT-ID component collection (distributed or otherwise) and/or features may be implemented via the microprocessor and/or via embedded components; e.g., via ASIC, coprocessor, DSP, FPGA, and/or the like. Alternately, some implementations of the IT-ID may be implemented with embedded components that are configured and used to achieve a variety of features or signal processing.

Depending on the particular implementation, the embedded components may include software solutions, hardware solutions, and/or some combination of both hardware/software solutions. For example, IT-ID features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the IT-ID features. A hierarchy of programmable interconnects allow logic blocks to be interconnected as needed by the IT-ID system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the IT-ID may be developed on regular FPGAs and then migrated into a fixed version that more resembles ASIC implementations. Alternate or coordinating implementations may migrate IT-ID controller features to a final ASIC instead of or in addition to FPGAs. Depending on the implementation all of the aforementioned embedded components and microprocessors may be considered the "CPU" and/or "processor" for the IT-ID.

Power Source

The power source 786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 786 is connected to at least one of the interconnected subsequent components of the IT-ID thereby providing an electric current to all subsequent components. In one example, the power source 786 is connected to the system bus component 704. In an alternative embodiment, an outside power source 786 is provided through a connection across the I/O 708 interface. For example, a USB and/or IEEE 1394 connection carries both data and power across the connection and is therefore a suitable source of power.

Interface Adapters

Interface bus(ses) 707 may accept, connect, and/or communicate to a number of interface adapters, conventionally although not necessarily in the form of adapter cards, such as but not limited to: input output interfaces (I/O) 708, storage interfaces 709, network interfaces 710, and/or the like. Optionally, cryptographic processor interfaces 727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 709 may accept, communicate, and/or connect to a number of storage devices such as, but not limited to: storage devices 714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 710 may accept, communicate, and/or connect to a communications network 713. Through a communications network 713, the IT-ID controller is accessible through remote clients 733b (e.g., computers with web browsers) by users 733a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed IT-ID), architectures may similarly be employed to pool, load balance, and/or otherwise increase the communicative bandwidth required by the IT-ID controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 710 may be used to engage with various communications network types 713. For example, multiple network interfaces may be employed to allow for the communication over broadcast, multicast, and/or unicast networks.

Input Output interfaces (I/O) 708 may accept, communicate, and/or connect to user input devices 711, peripheral devices 712, cryptographic processor devices 728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 711 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 712 may be connected and/or communicate to I/O and/or other facilities of the like such as network interfaces, storage interfaces, directly to the interface bus, system bus, the CPU, and/or the like. Peripheral devices may be external, internal and/or part of the IT-ID controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the IT-ID controller may be embodied as an embedded, dedicated, and/or monitor-less (i.e., headless) device, wherein access would be provided over a network interface connection.

Cryptographic units such as, but not limited to, microcontrollers, processors 726, interfaces 727, and/or devices 728 may be attached, and/or communicate with the IT-ID controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 729. However, memory is a fungible technology and resource, thus, any number of memory embodiments may be employed in lieu of or in concert with one another. It is to be understood that the IT-ID controller and/or a computer systemization may employ various forms of memory 729. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 729 will include ROM 706, RAM 705, and a storage device 714. A storage device 714 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 729 may contain a collection of program and/or database components and/or data such as, but not limited to: operating system component(s) 715 (operating system); information server component(s) 716 (information server); user interface component(s) 717 (user interface); Web browser component(s) 718 (Web browser); database(s) 719; mail server component(s) 721; mail client component(s) 722; cryptographic server component(s) 720 (cryptographic server); the IT-ID component(s) 735; and/or the like (i.e., collectively a component collection). These components may be stored and accessed from the storage devices and/or from storage devices accessible through an interface bus. Although non-conventional program components such as those in the component collection, typically, are stored in a local storage device 714, they may also be loaded and/or stored in memory such as: peripheral devices, RAM, remote storage facilities through a communications network, ROM, various forms of memory, and/or the like.

Operating System

The operating system component 715 is an executable program component facilitating the operation of the IT-ID controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the IT-ID controller to communicate with other entities through a communications network 713. Various communication protocols may be used by the IT-ID controller as a subcarrier transport mechanism for interaction, such as, but not limited to: multicast, TCP/IP, UDP, unicast, and/or the like.

Information Server

An information server component 716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the IT-ID controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the IT-ID database 719, operating systems, other program components, user interfaces, Web browsers, and/or the like.

Access to the IT-ID database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the IT-ID. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the IT-ID as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 718 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the IT-ID enabled nodes. The combined application may be nugatory on systems employing standard Web browsers.

Mail Server

A mail server component 721 is a stored program component that is executed by a CPU 703. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the IT-ID.

Access to the IT-ID mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 722 is a stored program component that is executed by a CPU 703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 720 is a stored program component that is executed by a CPU 703, cryptographic processor 726, cryptographic processor interface 727, cryptographic processor device 728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the IT-ID may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the IT-ID component to engage in secure transactions if so desired. The cryptographic component facilitates the secure accessing of resources on the IT-ID and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The IT-ID Database

The IT-ID database component 719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the IT-ID database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the IT-ID database is implemented as a data-structure, the use of the IT-ID database 719 may be integrated into another component such as the IT-ID component 735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 719 includes several tables 719*a-j*. A User table 719*a* includes fields such as, but not limited to: UserID, UserClientD, UserAccountName, UserAccountAddress, UserPaymentIdentifier(s) and/or the like. The user table may support and/or track multiple entity accounts on an IT-ID. A Client table 719*b* includes fields such as, but not limited to: ClientID, ClientUserID, ClientName, ClientAddress, ClientTransactionID, ClientPaymentIdentifier(s) and/or the like. A Project table 719*c* includes fields such as, but not limited to: ProjectID, ProjectUserID, ProjectClientID, ProjectDuration, ProjectStateDate, ProjectEndDate, ProjectTemplateID, ProjectInsfrastuctureData and/or the like. A Transaction table 719*d* includes fields such as, but not limited to: TransactionID, TransactionUserID, Transaction ClientID, TransactionProjectID, TransactionTemplateID, TransactionPurchasePrice, TransactionCurrentPrice, TransactionUsageDate, TransactionUsageTime, TransactionUsageTally, TransactionMaximumUsage, TransactionDepreciationRate, TransactionRefundStatus, TransactionResidualValue and/or the like. A Hardware table 719*e* includes fields such as, but not limited to: HardwareID, HardwareUserID, HarwareClientID, HardwareProjectID, HardwareType, HardwareName, HardwareProtocols, Hardware AddressInfo, HardwareUsageHistory, HardwareRequirements and/or the like. An Operating System table 719*f* includes fields such as, but not limited to: OSID, OSUserID, OSClientID, OSProjectID, OSType, OSName, OSVersion, OSProtocols, OSUsageHistory, OSRequirements and/or the like. A Storage table 719*g* includes fields such as, but not limited to: StorageID, StorageUserID, StorageClientID, StorageProjectID, StorageType, StorageName, StorageSize, StorageProtocols, StorageUsageHistory, StorageRequirements and/or the like. A Network table 719*h* includes fields such as, but not limited to: NetworkID, NetworkUserID, NetworkClientID, NetworkProjectID, NetworkType, NetworkName, NetworkProtocols, NetworkUsageHistory, NetworkRequirements and/or the like. A Template table 719*i* includes fields such as, but not limited to: TemplateID, TemplateUserID, TemplateClientID, TemplateProjectID, TemplateHardwareID, TemplateOSID, TemplateStorageID, TemplateNetworkID, TemplateVersion, TemplateUsageHistory and/or the like. A Parser table 719*j* includes fields such as, but not limited to: ParserID, ParserUserID, ParserClientID, ParserProjectID, ParserTemplateID, ParserHardwareID, ParserOSID, ParserStorageID, ParserNetworkID and/or the like.

In one embodiment, the IT-ID database may interact with other database systems. For example, employing a distributed database system, queries and data access by search IT-ID component may treat the combination of the IT-ID database, an integrated data security layer database as a single database entity.

In one embodiment, user programs may contain various user interface primitives, which may serve to update the IT-ID. Also, various accounts may require custom database tables depending upon the environments and the types of clients the IT-ID may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 719*a-j*. The IT-ID may be configured to keep track of various settings, inputs, and parameters via database controllers.

The IT-ID database may communicate to and/or with other components in a component collection, including itself, and/or facilities of the like. Most frequently, the IT-ID database communicates with the IT-ID component, other program components, and/or the like. The database may contain, retain, and provide information regarding other nodes and data.

The IT-IDs

The IT-ID component 735 is a stored program component that is executed by a CPU. In one embodiment, the IT-ID component incorporates any and/or all combinations of the aspects of the IT-ID that was discussed in the previous figures. As such, the IT-ID affects accessing, obtaining and the provision of information, services, transactions, and/or the like across various communications networks. The features and embodiments of the IT-ID discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the IT-ID's features and facilities, and in many cases reduce the costs, energy consumption/requirements, and extend the life of IT-ID's underlying infrastructure; this has the added benefit of making the IT-ID more reliable. Similarly, many of the features and mechanisms are designed to be easier for users to use and access, thereby broadening the audience that may enjoy/employ and exploit the feature sets of the IT-ID; such ease of use also helps to increase the reliability of the IT-ID. In addition, the feature sets include heightened security as noted via the Cryptographic components 720, 726, 728 and throughout, making access to the features and data more reliable and secure.

The IT-ID transforms user infrastructure requests, and user purchase requests inputs via IT-ID components User Self-service Portal 741, Template Matching 742, and, Design Engine 743, XMI Export 744, XMI Parser 745 into infrastructure design product and infrastructure allocation outputs.

The IT-ID component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the IT-ID server employs a cryptographic server to encrypt and decrypt communications. The IT-ID component may communicate to and/or with other components in a component collection, including itself, and/or facilities of the like. Most frequently, the IT-ID component communicates with the IT-ID database, operating systems, other program components, and/or the like. The IT-ID may contain, communicate, generate, obtain, and/or provide program component, system, user, and/or data communications, requests, and/or responses.

Distributed IT-IDs

The structure and/or operation of any of the IT-ID node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the IT-ID controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the IT-ID controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of mes-
sage
do {
   $input = "";
   $input = socket_read($client, 1024);
   $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/
index.jsp?topic=/com.ibm
.IBMDI.doc/referenceguide295.htm and other parser implementations:

http://publib.boulder.ibm.com/infocenter/tivihelp/v2r1/
index.jsp?topic=/com.ibm
.IBMDI.doc/referenceguide259.htm all of which are hereby expressly incorporated by reference.

Figure 7B:
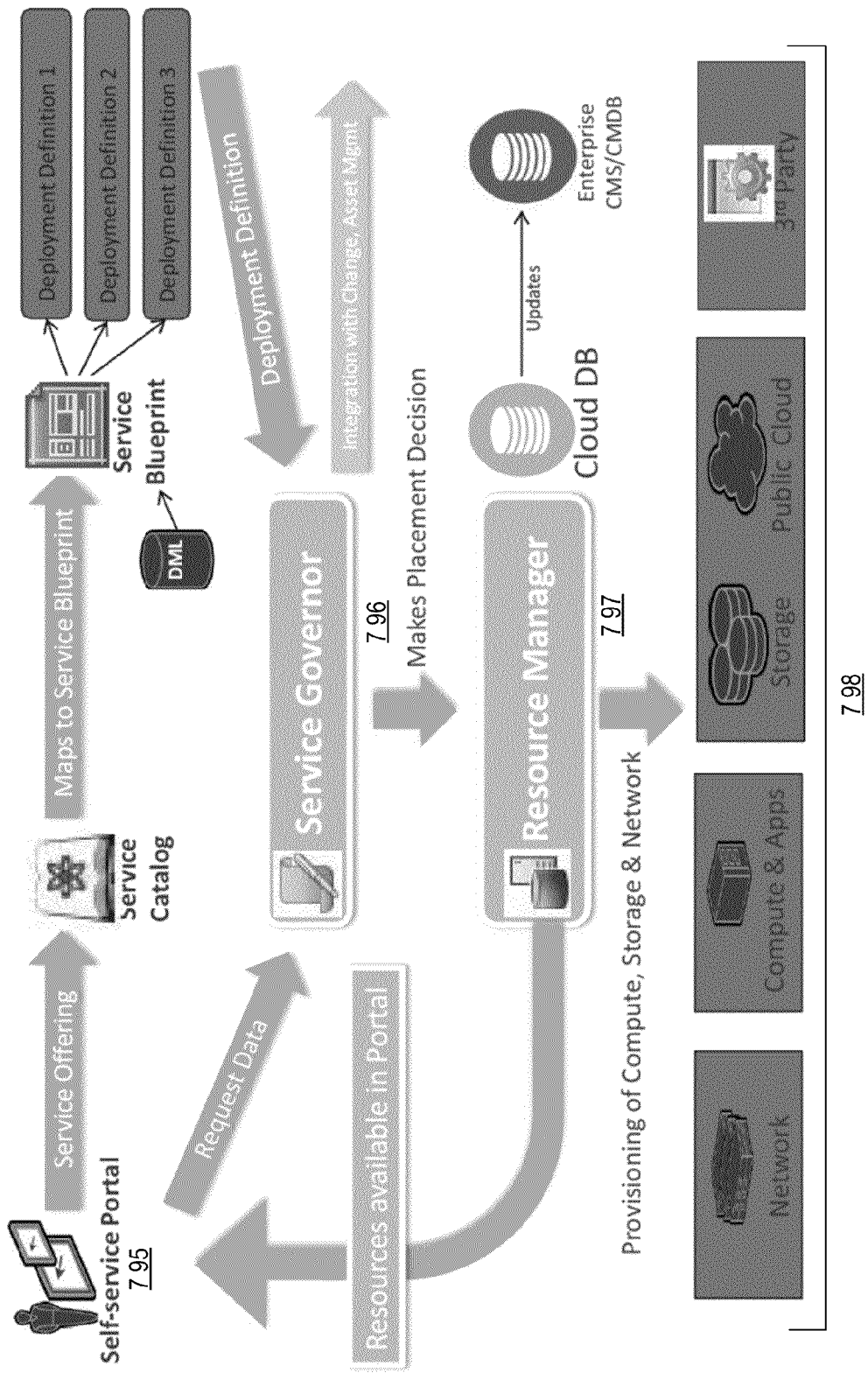
FIG. 7B shows a block diagram illustrating further technological embodiments of the IT-ID.

FIG. 7b shows a block diagram illustrating further embodiments of the IT-ID. In some implementations, IT-ID may use a topological and/or logical arrangement of features different from those that have been described in the preceding figures. For example, users 795 may interact with Service Governor 796 and Resource Manager 797 systems in order to obtain similar resources 798 as described above.

In order to address various issues and advance the art, the entirety of this application for INFORMATION TECHNOLOGY INFRASTRUCTURE DESIGN APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of an IT-ID individual and/or enterprise user, database configuration and/or relational model, data type, data transmission and/or network framework, syntax structure, and/or the like, various embodiments of the IT-ID, may be implemented that enable a great deal of flexibility and customization. For example, aspects of the IT-ID may be adapted for cloud computing services. While various embodiments and discussions of the IT-ID have been directed to information technology infrastructure design, however, it is to be understood that the embodiments described herein may be readily configured and/or customized for a wide variety of other applications and/or implementations.

What is claimed is:

1. An information technology infrastructure and excess hardware-reducing design apparatus to transform user infrastructure requests inputs to infrastructure design product and infrastructure allocation outputs, comprising:
   a processor; and
   a memory in communication with the processor containing processor-readable instructions to:
      receive a user automated project infrastructure request;
      identify the user automated project infrastructure request with pre-defined project infrastructure templates;
      wherein identifying the user automated project infrastructure request with pre-defined project infrastructure templates automatically reduces excess hardware requirements;
      wherein the project infrastructure template is converted to project infrastructure design diagrams via hand-made modeling tools;
      wherein the project infrastructure template is an editable resource flow chart diagram;
      wherein the project infrastructure template is converted to project infrastructure design diagrams via Unified Modeling Language (UML);
      wherein the infrastructures specified in the parsed structured data file may separate project resources into a plurality of purpose-specific zones; and
      wherein the Unified Modeling Language is Systems Modeling Language (SysML);
   retrieve a project infrastructure template that best matches the user automated project infrastructure request;
   generate a structured data file based on the project infrastructure template;
      wherein the structured data file is Extensible Markup Language Metadata Interchange (XMI);
   parse the structured data file;
   send the parsed structured data file to an infrastructure provider;
   allocate infrastructures specified in the parsed structured data file to be implemented by the user; and
   allocate new infrastructure resources wherein user provides requests to change the infrastructure that was sent.

2. An information technology infrastructure design processor-implemented method to transform user infrastructure requests inputs to infrastructure design product and infrastructure allocation outputs, comprising:
   receiving a user automated project infrastructure request;
   correlating the user automated project infrastructure request with pre-defined project infrastructure templates;
   retrieving a project infrastructure template that best matches the user automated project infrastructure request;
   generating a structured data file based on the project infrastructure template;
   parsing the structured data file;
   sending the parsed structured data file to an infrastructure provider; and
   allocating infrastructures specified in the parsed structured data file to be implemented by the user.

3. The method of claim 2, wherein the project infrastructure template is converted to project infrastructure design diagrams via hand-made modeling tools.

4. The method of claim 2, wherein the project infrastructure template is converted to project infrastructure design diagrams via Unified Modeling Language (UML).

5. The method of claim 4, wherein the Unified Modeling Language is Systems Modeling Language (SysML).

6. The method of claim 2, wherein the structured data file is Extensible Markup Language Metadata Interchange (XMI).

7. The method of claim 2, further comprising:
   allocating new infrastructure resources wherein user provides requests to change the infrastructure that was sent.

8. The method of claim 2, wherein the project infrastructure template is an editable resource flow chart diagram.

9. The method of claim 2, wherein the infrastructures specified in the parsed structured data file may separate project resources into a plurality of purpose-specific zones.

10. An information technology infrastructure design apparatus to transform user infrastructure requests inputs to infrastructure design product and infrastructure allocation outputs, comprising:
a processor; and
a memory in communication with the processor containing processor-readable instructions to:
receive a user automated project infrastructure request;
correlate the user automated project infrastructure request with pre-defined project infrastructure templates;
retrieve a project infrastructure template that best matches the user automated project infrastructure request;
generate a structured data file based on the project infrastructure template;
parse the structured data file;
send the parsed structured data file to an infrastructure provider; and
allocate infrastructures specified in the parsed structured data file to be implemented by the user.

11. The apparatus of claim 10, wherein the project infrastructure template is converted to project infrastructure design diagrams via hand-made modeling tools.

12. The apparatus of claim 10, wherein the project infrastructure template is converted to project infrastructure design diagrams via Unified Modeling Language (UML).

13. The apparatus of claim 12, wherein the Unified Modeling Language is Systems Modeling Language (SysML).

14. The apparatus of claim 10, wherein the structured data file is Extensible Markup Language Metadata Interchange (XMI).

15. The apparatus of claim 10, further comprising instructions to:
allocate new infrastructure resources wherein user provides requests to change the infrastructure that was sent.

16. The apparatus of claim 10, wherein the project infrastructure template is an editable resource flow chart diagram.

17. The apparatus of claim 9, wherein the infrastructures specified in the parsed structured data file may separate project resources into a plurality of purpose-specific zones.

18. A non-transitory processor-readable storage medium, the medium comprising instructions to:
receive a user automated project infrastructure request;
correlate the user automated project infrastructure request with pre-defined project infrastructure templates;
retrieve a project infrastructure template that best matches the user automated project infrastructure request;
generate a structured data file based on the project infrastructure template;
parse the structured data file;
send the parsed structured data file to an infrastructure provider; and
allocate infrastructures specified in the parsed structured data file to be implemented by the user.

19. The medium of claim 18, wherein the project infrastructure template is converted to project infrastructure design diagrams via hand-made modeling tools.

20. The medium of claim 18, wherein the project infrastructure template is converted to project infrastructure design diagrams via Unified Modeling Language (UML).

21. The medium of claim 20, wherein the Unified Modeling Language is Systems Modeling Language (SysML).

22. The medium of claim 18, wherein the structured data file is Extensible Markup Language Metadata Interchange (XMI).

23. The medium of claim 18, further comprising instructions to:
allocate new infrastructure resources wherein user provides requests to change the infrastructure that was sent.

24. The medium of claim 18, wherein the project infrastructure template is an editable resource flow chart diagram.

25. The medium of claim 18, wherein the infrastructures specified in the parsed structured data file may separate project resources into a plurality of purpose-specific zones.

* * * * *